Figure 1:
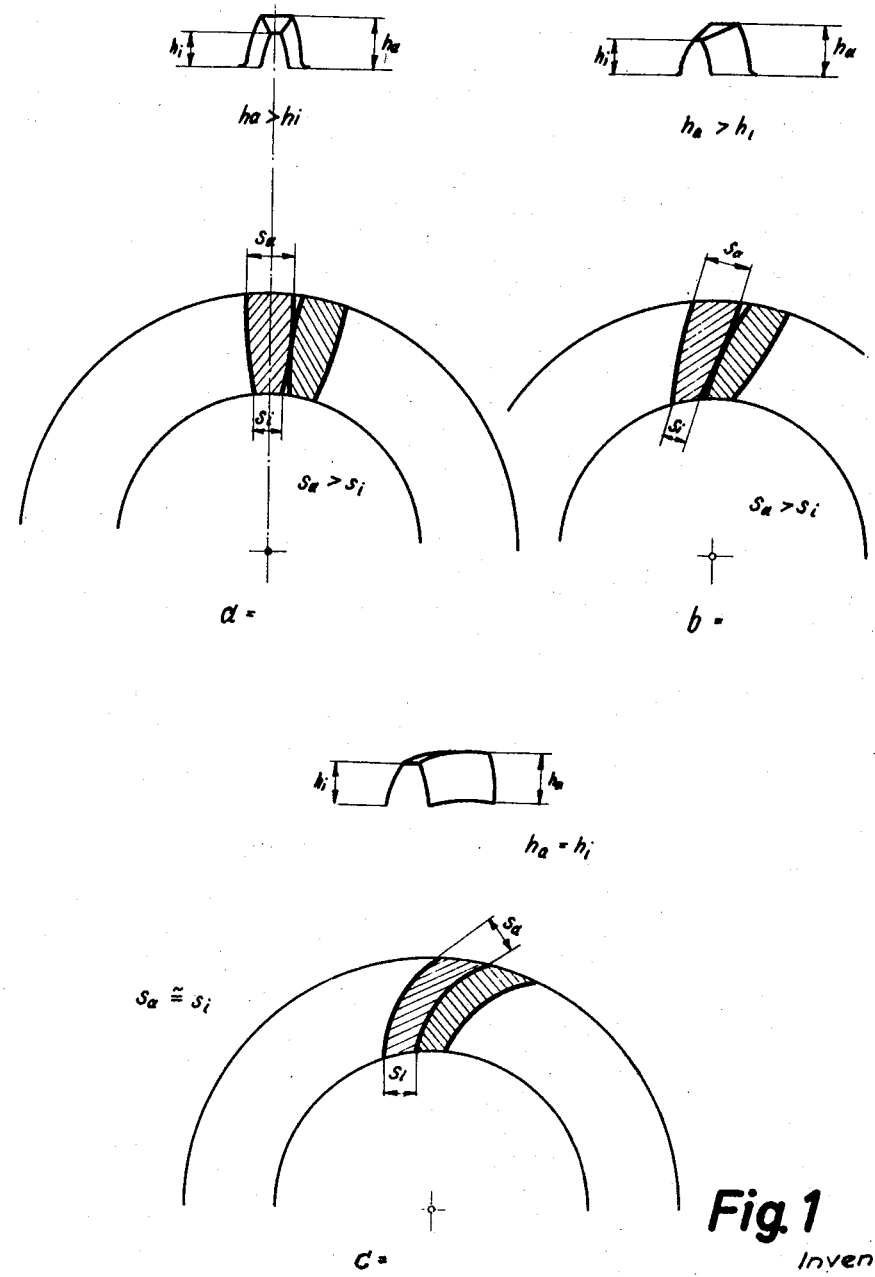

Aug. 16, 1960 G. APITZ 2,949,062
METHODS OF CONTINUOUSLY CUTTING GEARWHEELS
Filed May 7, 1957 42 Sheets-Sheet 3

Inventor
GERHARD APITZ

Aug. 16, 1960  G. APITZ  2,949,062
METHODS OF CONTINUOUSLY CUTTING GEARWHEELS
Filed May 7, 1957  42 Sheets-Sheet 5
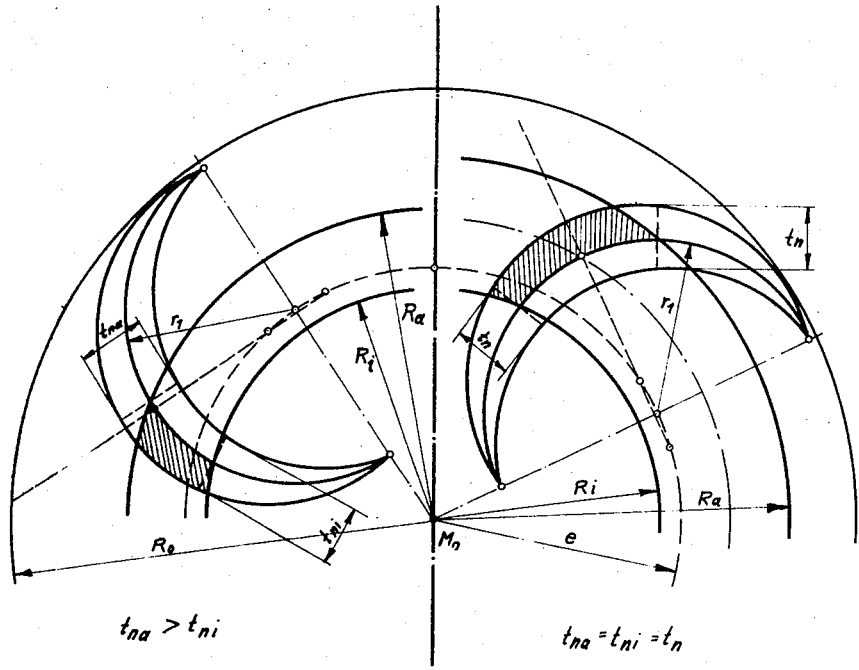
$t_{na} > t_{ni}$        $t_{na} = t_{ni} = t_n$
Fig. 6        Fig. 7
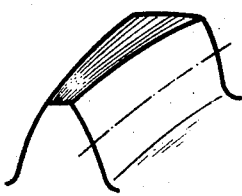 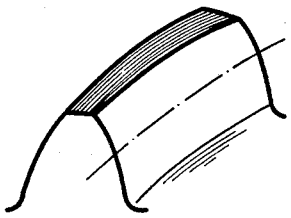
INVENTOR
GERHARD APITZ
By Jannsen & Beaman
atty Inventor
GERHARD APITZ Inventor
GERHARD APITZ Aug. 16, 1960

G. APITZ 2,949,062

METHODS OF CONTINUOUSLY CUTTING GEARWHEELS

Filed May 7, 1957

42 Sheets-Sheet 14

INVENTOR
GERHARD APITZ

Inventor
GERHARD APITZ

Inventor
GERHARD APITZ

INVENTOR
GERHARD APITZ

Inventor
GERHARD APITZ

Aug. 16, 1960 G. APITZ 2,949,062
METHODS OF CONTINUOUSLY CUTTING GEARWHEELS
Filed May 7, 1957 42 Sheets-Sheet 24

INVENTOR
GERHARD APITZ $$\sin d_1 = \frac{r_{t_1}}{R_a} \qquad \sin d_2 = \frac{r_{t_2}}{R_a}$$

$$r_{t_1} = \frac{Z_1 \cdot m}{2} \qquad r_{t_2} = \frac{Z_2 \cdot m}{2} \qquad R_a = \frac{Z_p \cdot m}{2}$$

$$R_a = \frac{r_{t_1}}{\sin d_1} = \frac{r_{t_2}}{\sin d_2}$$

$$Z_p \cdot \frac{m}{2} = \frac{m}{2} \cdot \frac{Z_1}{\sin d_1} = \frac{m}{2} \cdot \frac{Z_2}{\sin d_2}$$

$$Z_p = \frac{Z_1}{\sin d_1} = \frac{Z_2}{\sin d_2}$$

Inventor
GERHARD APITZ

Aug. 16, 1960  G. APITZ  2,949,062
METHODS OF CONTINUOUSLY CUTTING GEARWHEELS
Filed May 7, 1957  42 Sheets-Sheet 30

Inventor
GERHARD APITZ

Aug. 16, 1960  G. APITZ  2,949,062
METHODS OF CONTINUOUSLY CUTTING GEARWHEELS
Filed May 7, 1957  42 Sheets-Sheet 31

Inventor
GERHARD APITZ
By Sawaren A Beaman

Inventor
GERHARD APITZ

Inventor
GERHARD APITZ

Inventor
GERHARD APITZ

Inventor
GERHARD APITZ

Aug. 16, 1960     G. APITZ     2,949,062
METHODS OF CONTINUOUSLY CUTTING GEARWHEELS
Filed May 7, 1957     42 Sheets-Sheet 39

Inventor
GERHARD APITZ

Aug. 16, 1960     G. APITZ     2,949,062
METHODS OF CONTINUOUSLY CUTTING GEARWHEELS
Filed May 7, 1957     42 Sheets-Sheet 40

INVENTOR
GERHARD APITZ
By

Inventor
GERHARD APITZ
By Townsend Townsend
Atty.

United States Patent Office 2,949,062
Patented Aug. 16, 1960

2,949,062

METHODS OF CONTINUOUSLY CUTTING GEARWHEELS

Gerhard Apitz, Hamburg, Germany, assignor to Heidenreich & Harbeck, Wiesendamm, Germany, a German partnership Filed May 7, 1957, Ser. No. 657,561

Claims priority, application Germany May 7, 1956

6 Claims. (Cl. 90—5)

Gearwheels, more particularly bevel wheels with spiral teeth, have considerable advantages as compared with gearwheels having straight or inclined teeth, more particularly increased operational life and quieter running. This advantage is due to the fact that the arcuate shape provides better engagement of the wheels. However, these advantages can be fully exploited only if the tooth system is manufactured in accordance with theoretical principles and ground after heat treatment.

It is an object of the invention to provide a tooth system which not only fulfills these requirements but also allows of complete interchangeability.

It is known that deformations due to heat treatment must be removed by grinding the tooth system if heat-treated spur wheels are to be produced on an interchangeable basis and to the limits which are necessary for high quality and which are particularly important where gearwheels are highly loaded and must run quietly. What occurs with spur wheels applies even more to bevel wheels, for the same are more difficult to produce than spur wheels. If interchangeable bevel wheels can be produced, the manufacture and assembly of parts become simpler, and interchangeability is essential where a client orders the same wheels from different suppliers or where the gearwheels are produced by mass production.

*Prior art*

Bevel wheels having straight and inclined teeth have long been produced on an interchangeable basis.

To this end, a basic wheel, known as a pattern wheel, is necessary on which manufacture of the gearwheels is based.

A pattern wheel is not required for the production of completely interchangeable bevel wheels having straight and inclined teeth if a device for testing the tooth shape and flank lines of the bevel wheels is available, for example, of the kind described more particularly in German specification No. 932,989.

It is also known to manufacture completely interchangeable spur wheels, and the requisite test gear has long been available.

The present-day manufacture of bevel wheels with spiral teeth is quite another matter. Such bevel wheels are not produced to be interchangeable but in batches. The various batches are numbered and each wheel is marked with the amount of deviation from the nominal size. These deviations, which usually vary from wheel to wheel of a batch, must be borne in mind when the wheels are fitted, so that fitting is very complicated.

The spiral tooth systems most used and known at present are produced by milling with face milling cutters and conical hobs. The tooth flanks produced by such cutting tools are rather rough and the profile (octoid) is produced during generation by addendum cuts which are spaced apart by a predetermined distance (depending upon the rate of hob feed) and which leave unevennesses behind in the profile.

This operation is also found where spur wheels are milled, planed or shaped. If for reasons of economy it is required not to grind the tooth system of such spur wheels, the tooth system is shaved prior to being case-hardened and heat treated, that is, the unevenness and roughness is removed from the tooth flanks by scrapers before case-hardening and heat treatment. This step provides relatively smooth tooth flanks and these wheels run quite satisfactorily after heat treatment, although the heat-treatment deformation is of course not eliminated.

However, the development of bevel wheels with spiral toothing has proceeded along quite different lines. The tooth system is first produced by milling. The rough and uneven tooth flanks are then case-hardened and heat treated, and efforts are made to remove the roughness, unevenness and heat-treatment deformation by lapping after the heat treatment. Shaving of the flank is not readily possible and lapping can be carried out only subsequently to the heat treatment because soft wheels tend to seize up. The wheels are lapped in batches. Of course, this method does not provide interchangeable wheels but merely delivery in batches, and quality is inconsistent, for it is impossible to know in advance how the tooth flanks, which engage with one another with the interposition of an abrasive, will be worn away during lapping. Lapping of the tooth flanks requires considerable time, lasting, according to the size, module, number of teeth and heat-treatment deformation, about 25 to 90 minutes per batch. In the light of the time required for lapping, grinding of the tooth flanks seems justified, for grinding takes the same or less time and ensures smooth tooth flanks and a very high degree of accuracy.

Most of the spiral tooth systems now conventional, however, have cyclic curves so that grinding by means of cup grinding wheels is not possible.

An exception to this is formed by spiral tooth systems produced by the dividing method of hobbing, for such tooth systems can be ground with cup wheels.

A disadvantage of spiral tooth systems thus produced as compared with other spiral tooth systems is that they can be cut only by means of the dividing method, whereas other hypoid tooth systems can be produced by continuous generation.

In the dividing method the tooth (face milling cutter) penetrates the gearwheel blank and machines the first tooth space. After the cutter has reached the full depth of the tooth space, the generating motion begins and the tooth profile (octoid) is formed. After the tooth profile has been generated, the tool and workpiece must be disengaged from one another in order that they may return to the starting position. During this return movement the workpiece executes an additional rotation through one division in order that the next tooth space may be machined. Hence the operations of cutting out a tooth space (generation and division) must be repeated as many times as there are teeth on the wheel. This repeated generation and division causes a considerable loss of time.

In continuous generation, on the other hand, the tool and workpiece rotate without disengaging from one another, and a cutter or a number of cutters cut one tooth space, while the next cutter or the next series of cutters immediately machine the adjacent tooth space.

Cutting to full tooth depth can be followed by generation, or cutting and generation can be simultaneous. In the former case cutting is more rapid and the generating arc is smaller.

Hence there is no dividing in continuous generation and there is only one hobbing movement, nor do the workpiece and tool have to return to the starting position.

Hence continuous generation occupies much less time than the dividing method.

However, there is no method so far known for the continuous generation of tooth flanks curved accurately or substantially arcuately and adapted to be ground with cup wheels.

*Technical problem*

The stringent requirements applied nowadays to bevel wheels in general and more particularly to back axle bevel wheels for motor vehicles can be summarised as follows:

(a) Very high loading capacity.
(b) Very quiet running.
(c) Complete interchangeability.
(d) Minimum production time.

Each of these requirements will now be considered:

(a) Only a spiral tooth is suitable for very high loads because its curvature makes it more stable than straight and spiral teeth.

Also, if the spiral tooth is so designed that the tooth depths are uniform and the inner and outer normal pitches are equal or substantially equal, the tooth thickness is substantially equal over the whole width of the tooth.

In straight, inclined or spiral teeth in which the tooth depths extend conically, tooth thickness alters continuously, being least on the inside and most on the outside.

Taking the thickness at the centre of the teeth as a basis, the teeth are undersized on the inside and oversized on the outside. This does not apply to spiral teeth of equal tooth thickness, nor is it the case where the tooth depth is uniform over the whole width of the tooth.

Another advantage of spiral teeth is that one convex flank always engages with one concave flank so that the engaging flanks are in more intimate relationship with one another. This is particularly noticeable in the case of spherical tooth flanks. The area of engagement is much greater with spiral teeth than with straight or inclined teeth. This means that the spiral tooth will withstand greater loads.

Fig. 1a and Fig. 1b represent a bevel gear with straight teeth and inclined teeth, respectively, and crowned longitudinal tooth edges. The outer depth of tooth $h_a$ is greater than the inner depth of tooth $h_i$; also the outer width of tooth $s_a$ is greater than the inner width of tooth $s_i$. The variations of the depth of tooth correspond to the shape of cone.

The curved teeth of Fig. 1c shows parallel addenda and dedenda, so that the outer depth of tooth $h_a$ is equal to the inner depth of tooth $h_i$. The outer width of tooth $s_a$ is equal or substantially equal to the inner width of tooth $s_i$.

Figure 2:
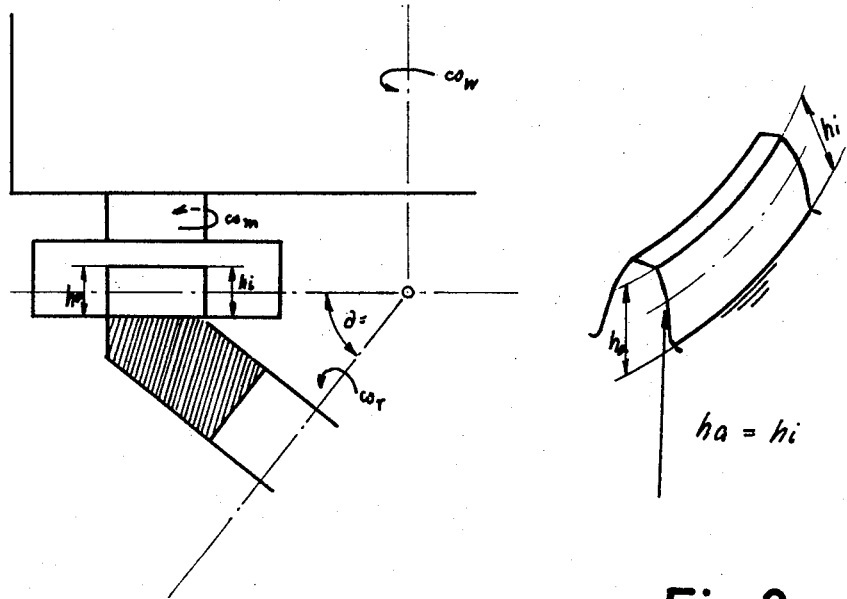
Figure 3:
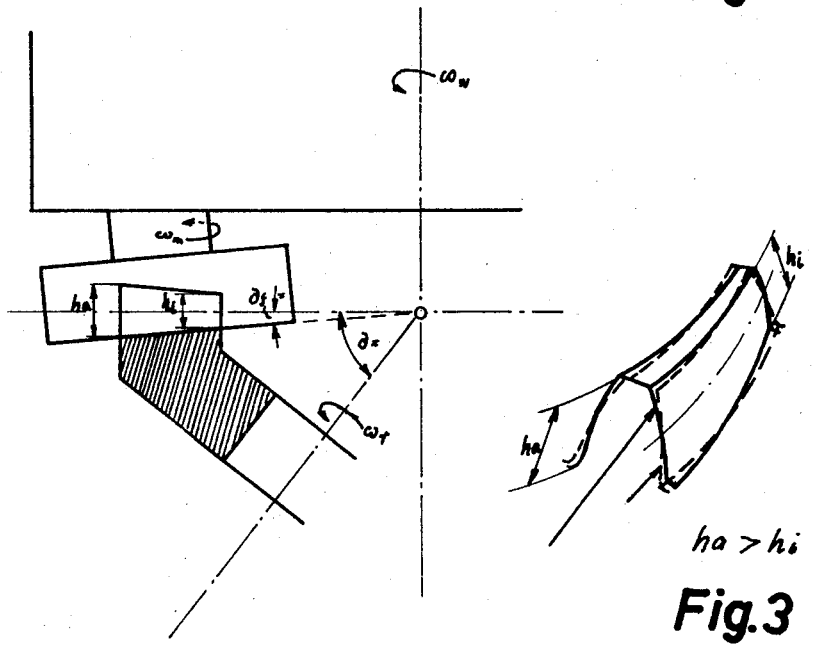

Fig. 2 is a schematic view of the bevel wheel inclined to the plane of the face gear and the pitch cone angle while the tool and cradle are in the plane of the face gear, Fig. 3 is similar to Fig. 2 except the tool has been pivoted from the face gear plane by the root angle.

Figure 4:
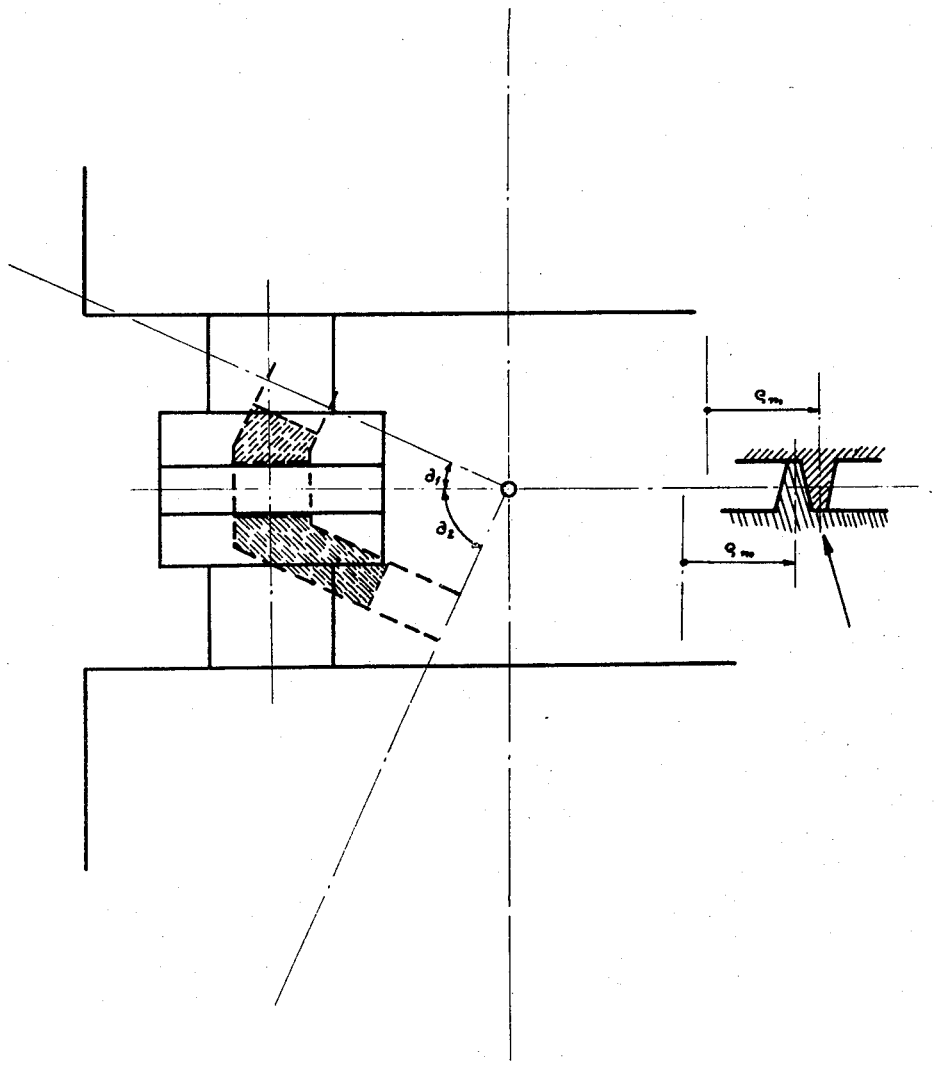
Figure 5:
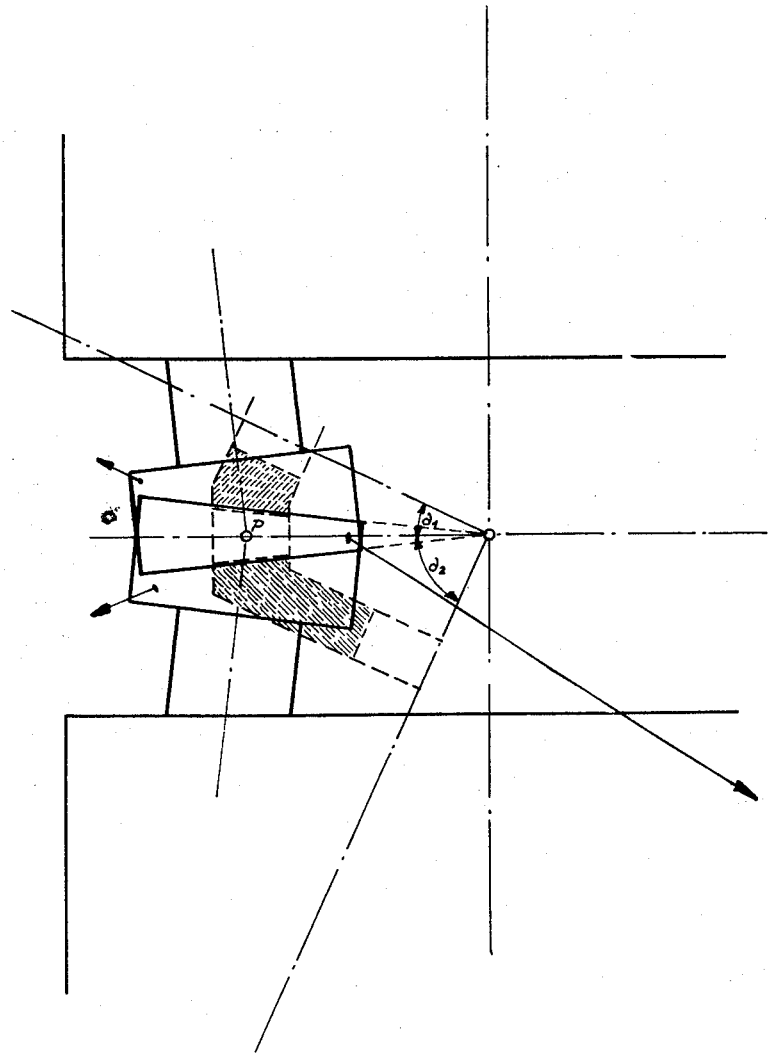
Figure 20:
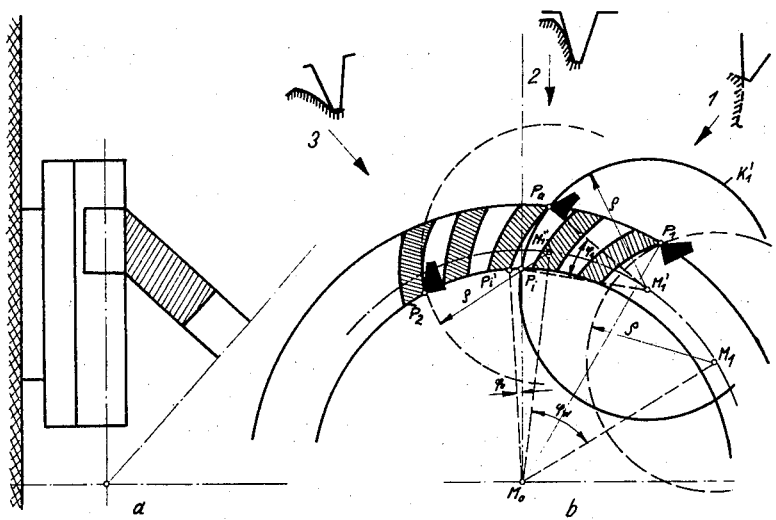
Figure 20:
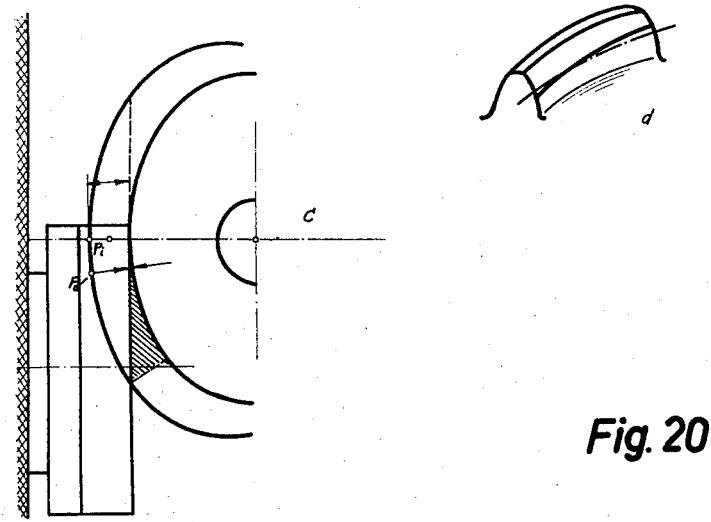
Figure 21:
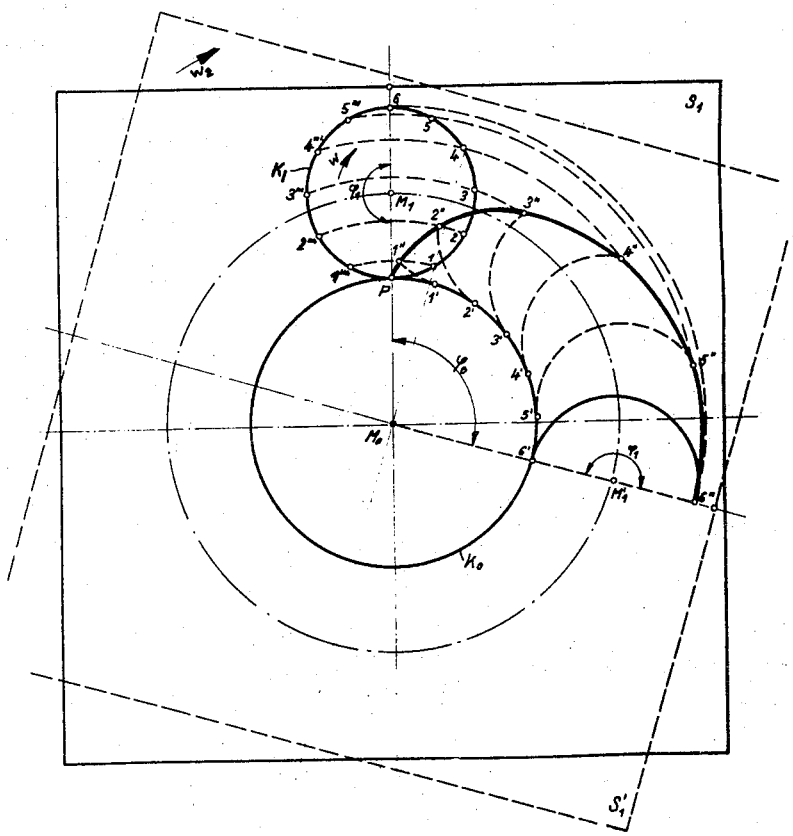
Figure 22:
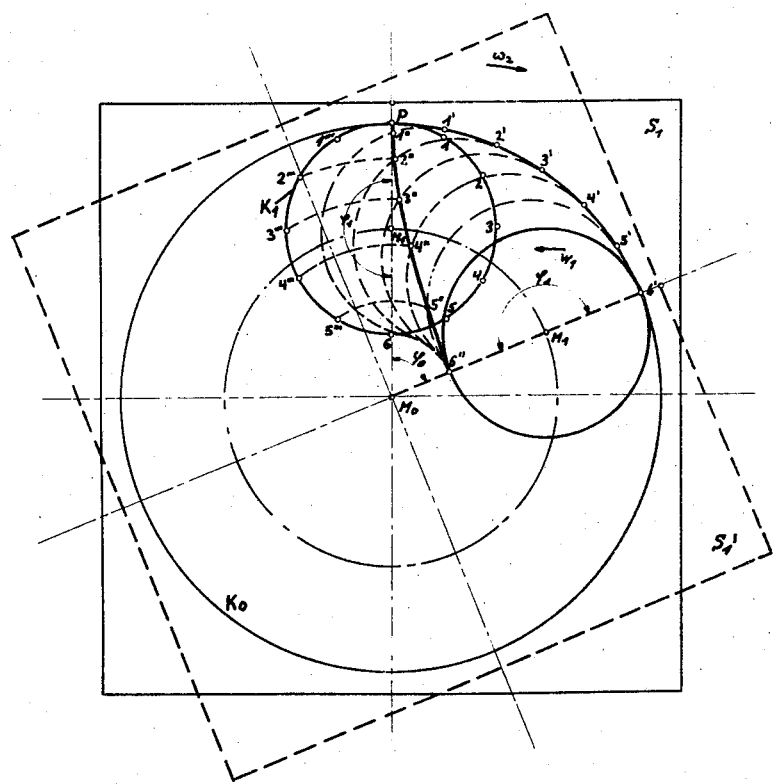
Figure 23:
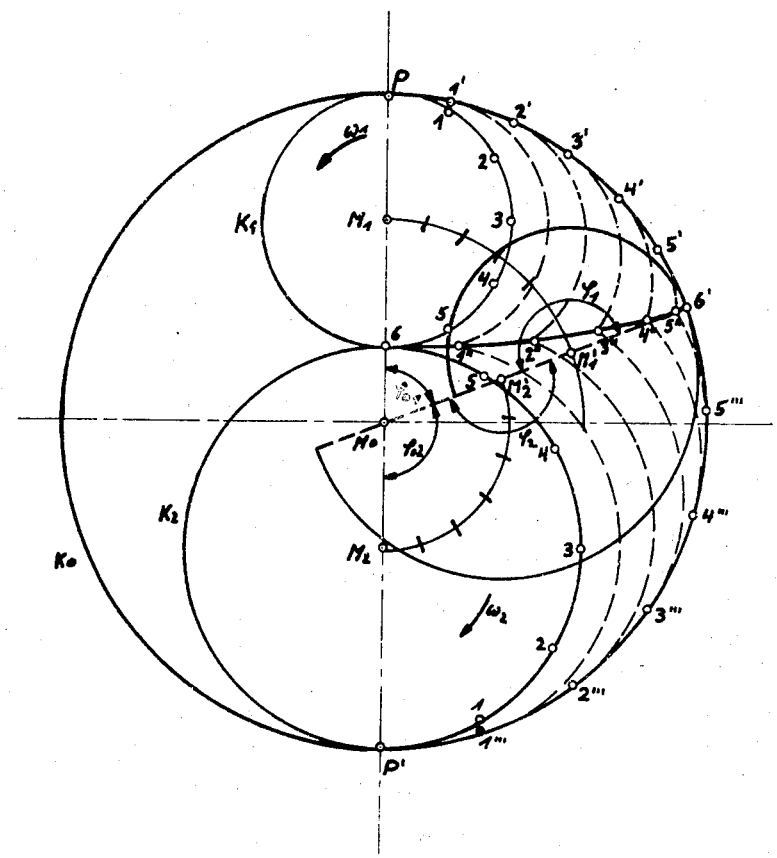
Figure 24:
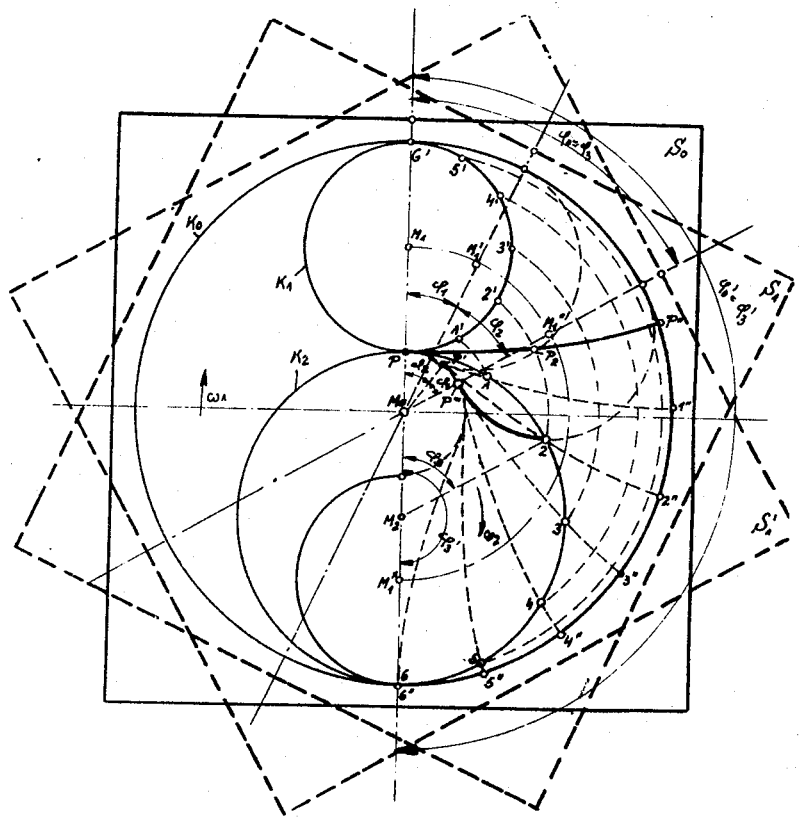
Figure 25:
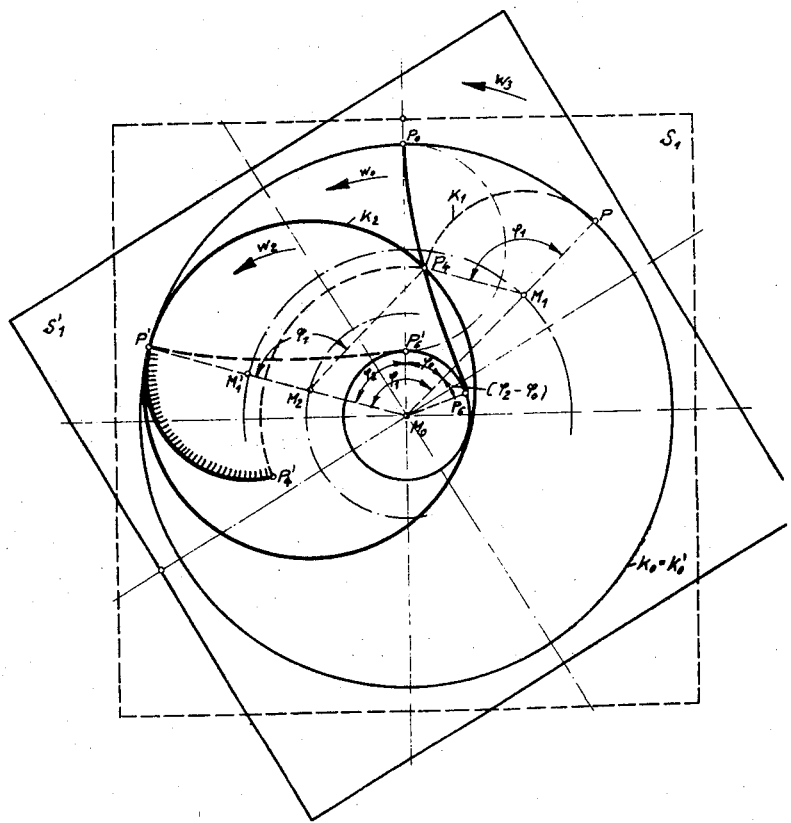
Figure 26:
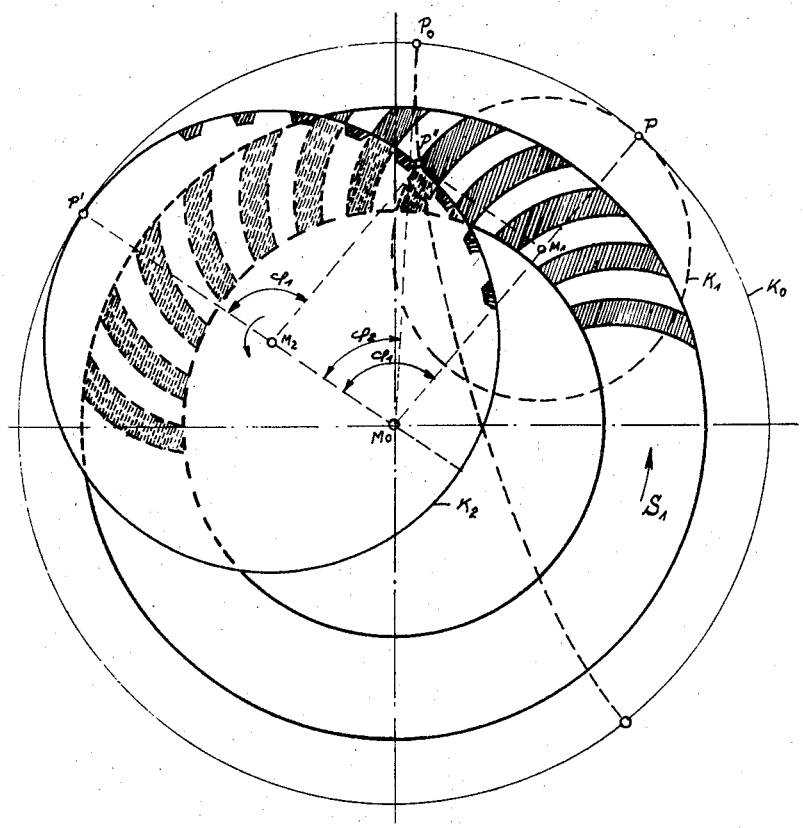
Figure 27:
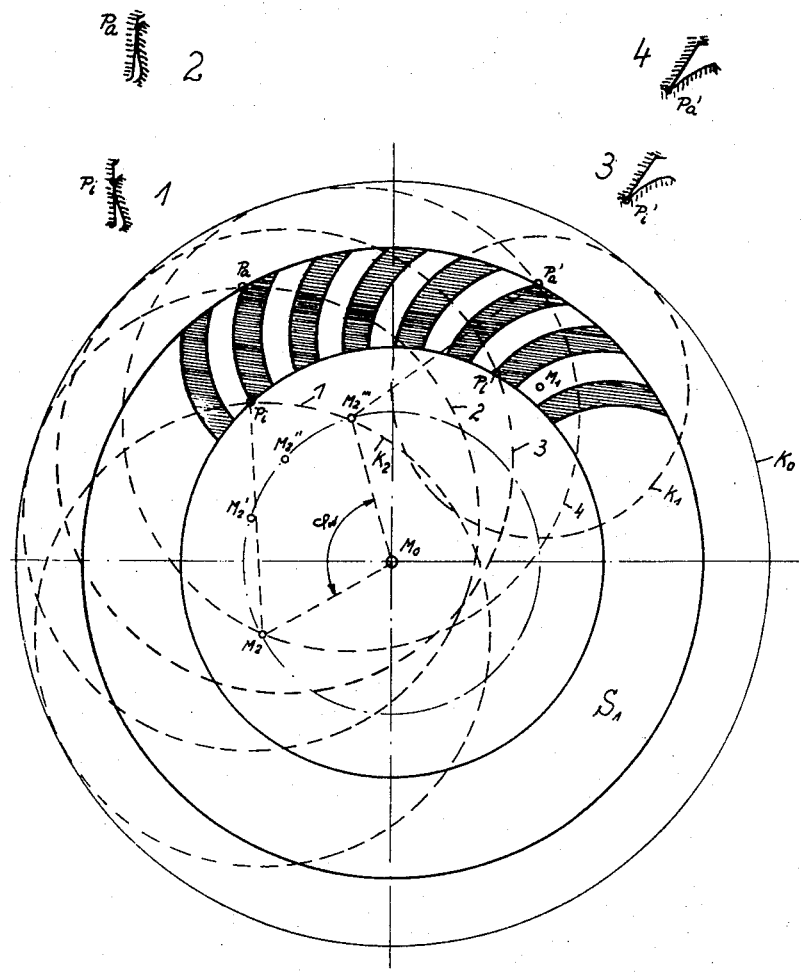
Figure 28:
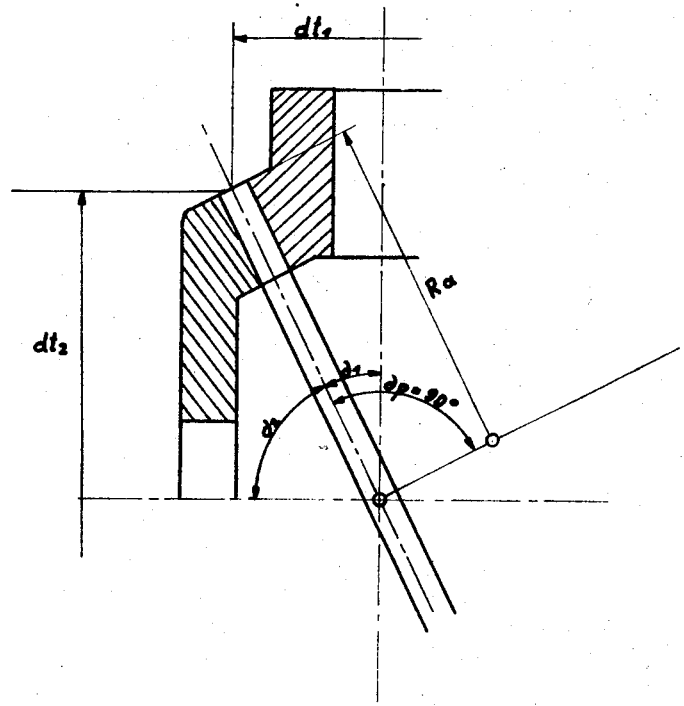
Figure 29:
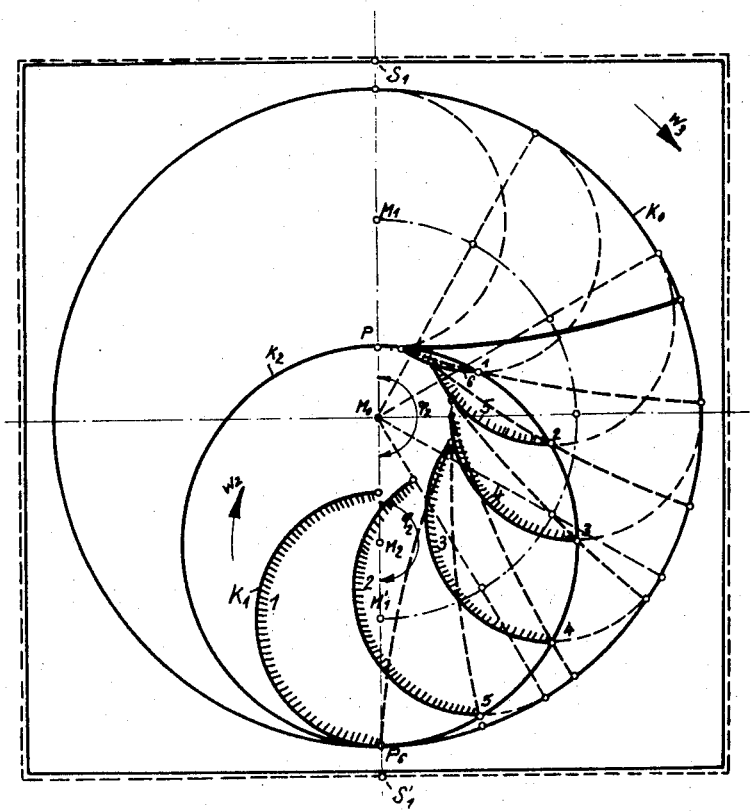

Fig. 4 schematically illustrates a pair of bevel gears in running engagement superimposed upon the cradle and tool relation, Fig. 5 is similar to Fig. 4 showing the tool axes non-coincident, Figs. 6 and 7 graphically and pictorially illustrate two types of tooth formation, Fig. 8 through 19 illustrate conventional forms of tooth flank line formation of cycloidally curved teeth, Figs. 20a, 20b and 20c show the cutter and gear wheel in cutting engagement for producing the tooth profile in a known manner, Fig. 20d shows the path of a single cut on the tooth, Fig. 21 further illustrates conventional cutting of the tooth profile, Fig. 22 is similar to Fig. 21 however discloses the method of cutting hypocycloid teeth profiles, Figs. 23 through 25 illustrate the production of cycloidally curved teeth according to the invention, Fig. 26 discloses a tool and gearwheel in engagement in accord with Figs. 23–25, Fig. 27 discloses schematically the tool and gearwheel motion and four positions theerof for tooth profile generation according to the invention, Fig. 28 schematically illustrates a gearwheel to be formed and relationships applied thereto, Fig. 29 graphically illustrates a cutter and gearwheel during profile generation.

Figure 30:
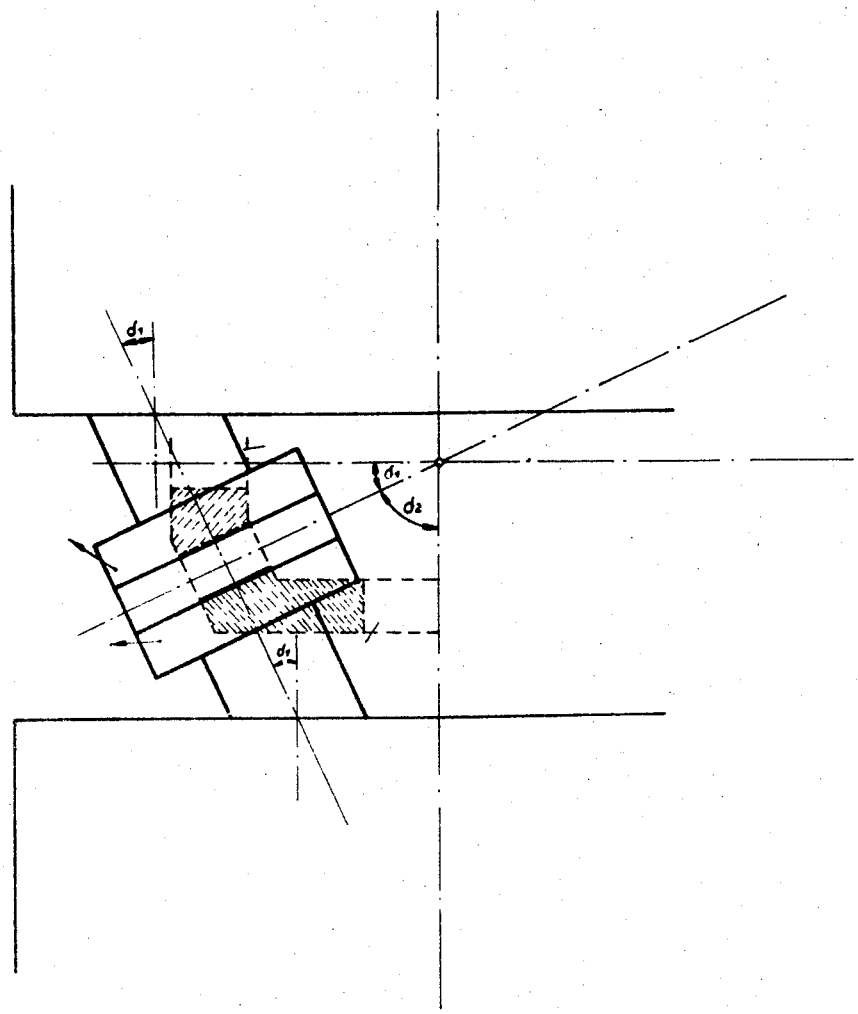
Figure 31:
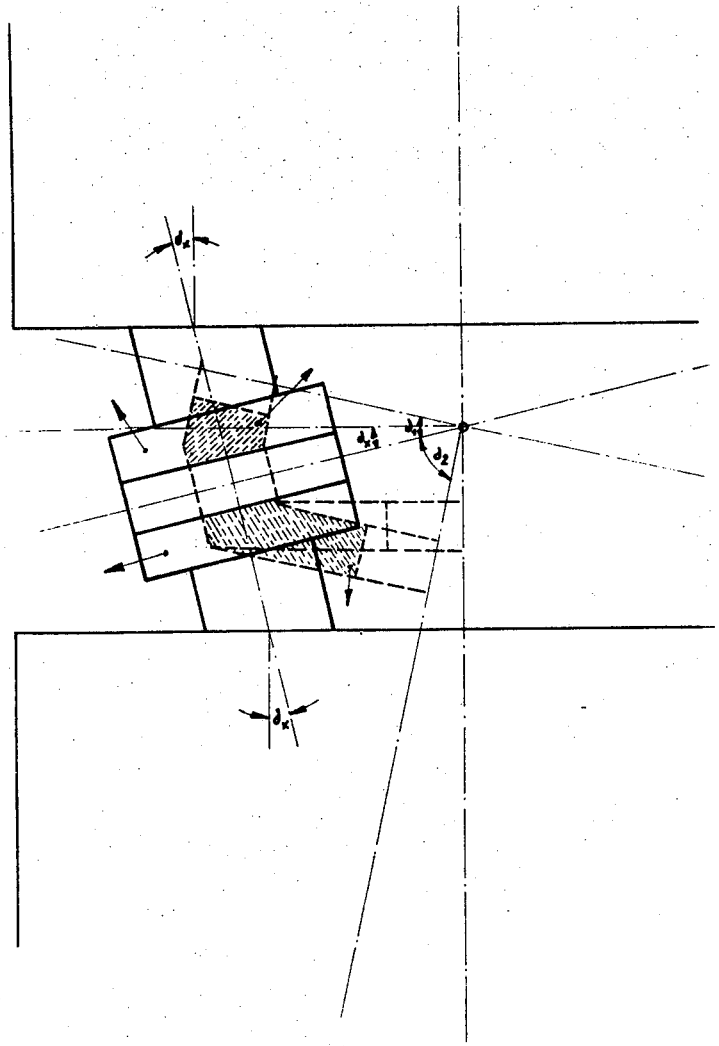
Figure 39:
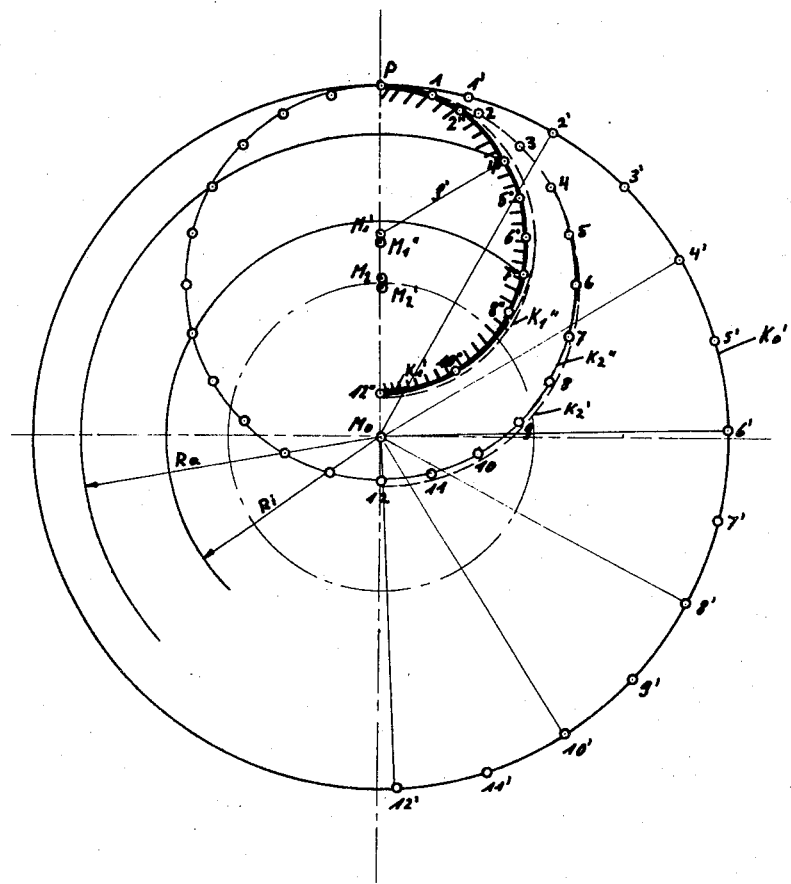
Figure 40:
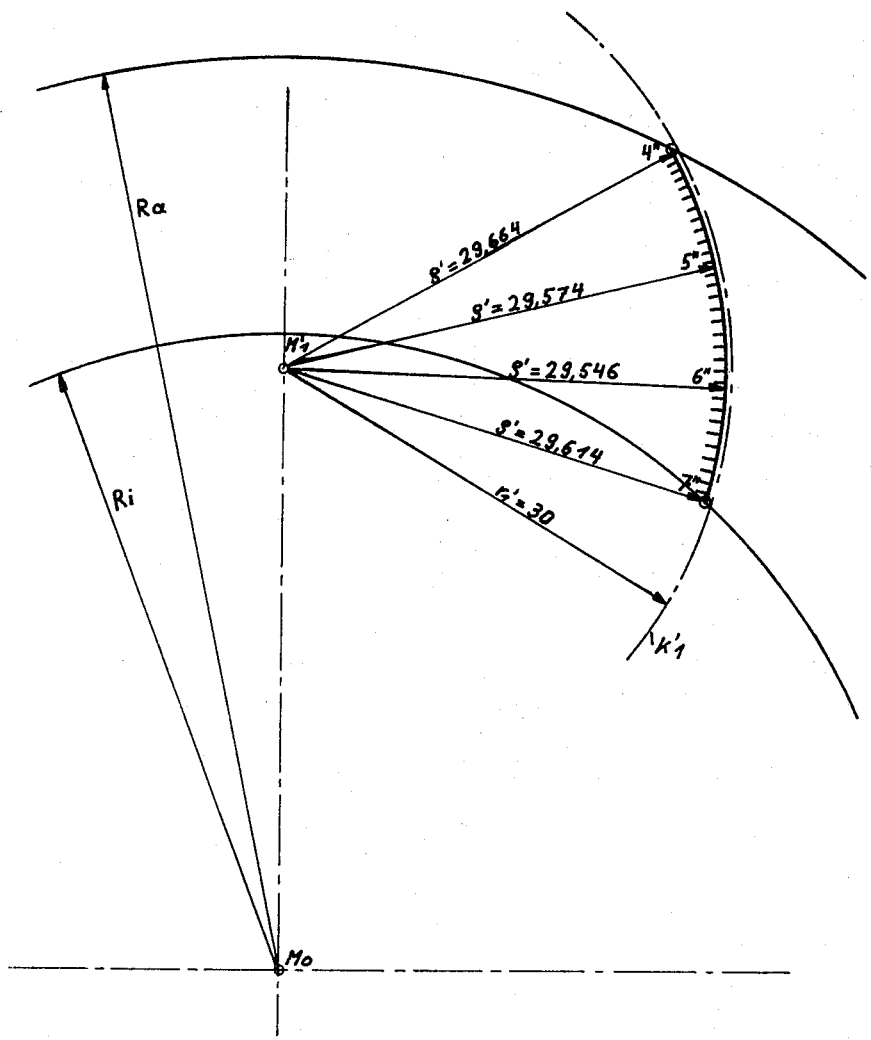
Figure 41:
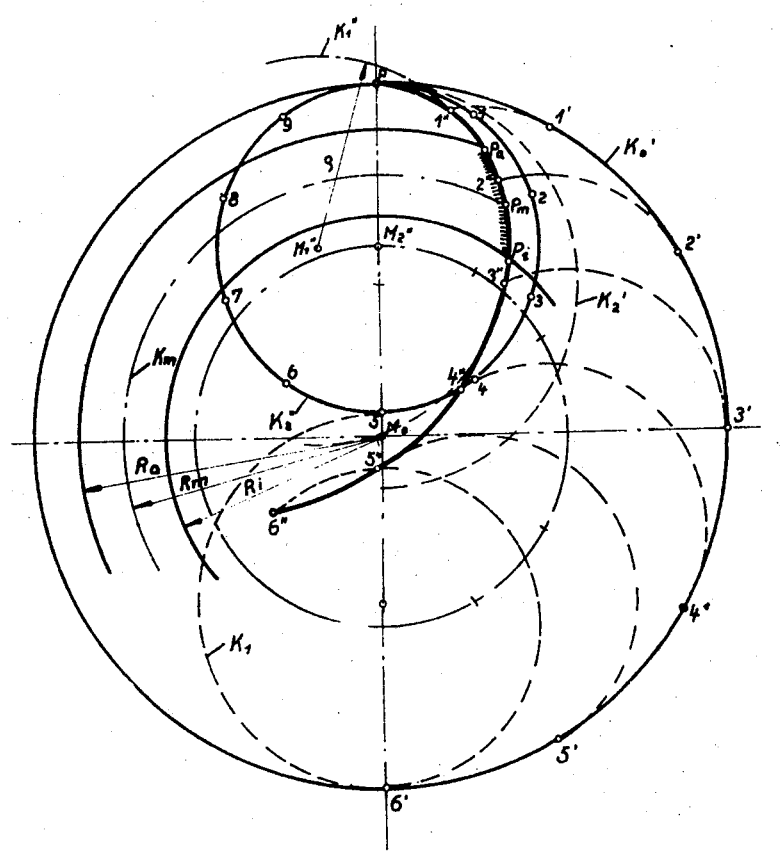
Figure 42:
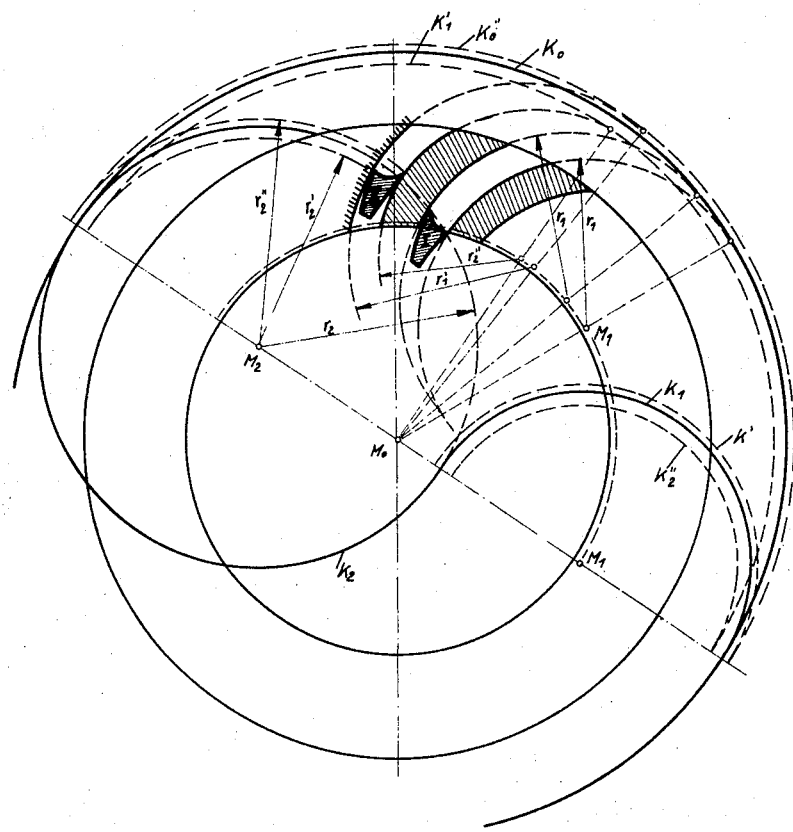
Figure 43:
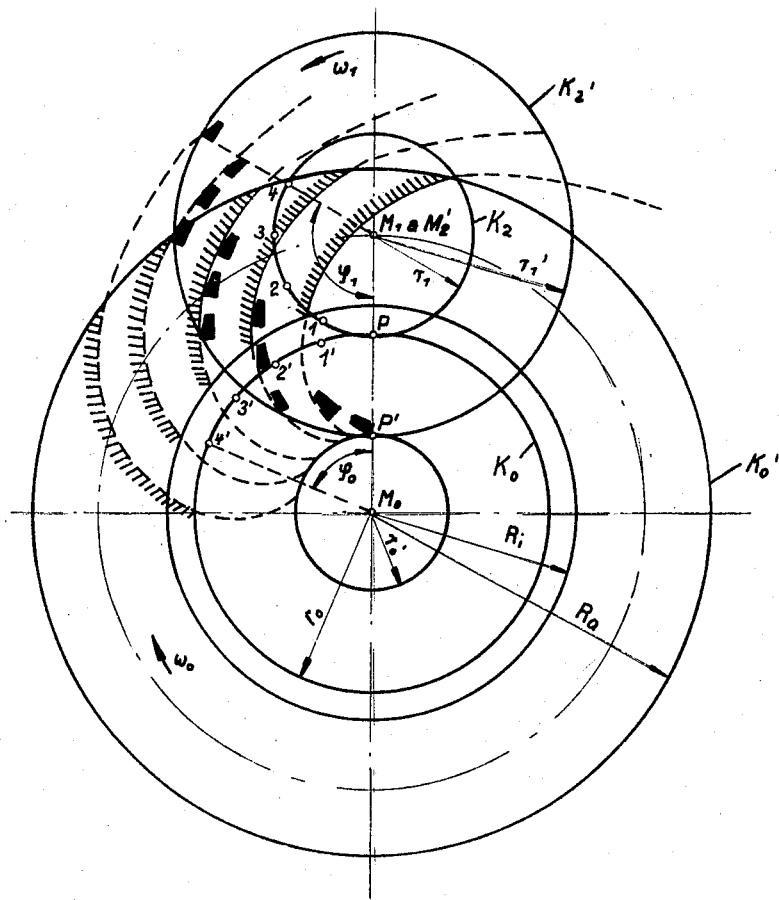
Figure 44:
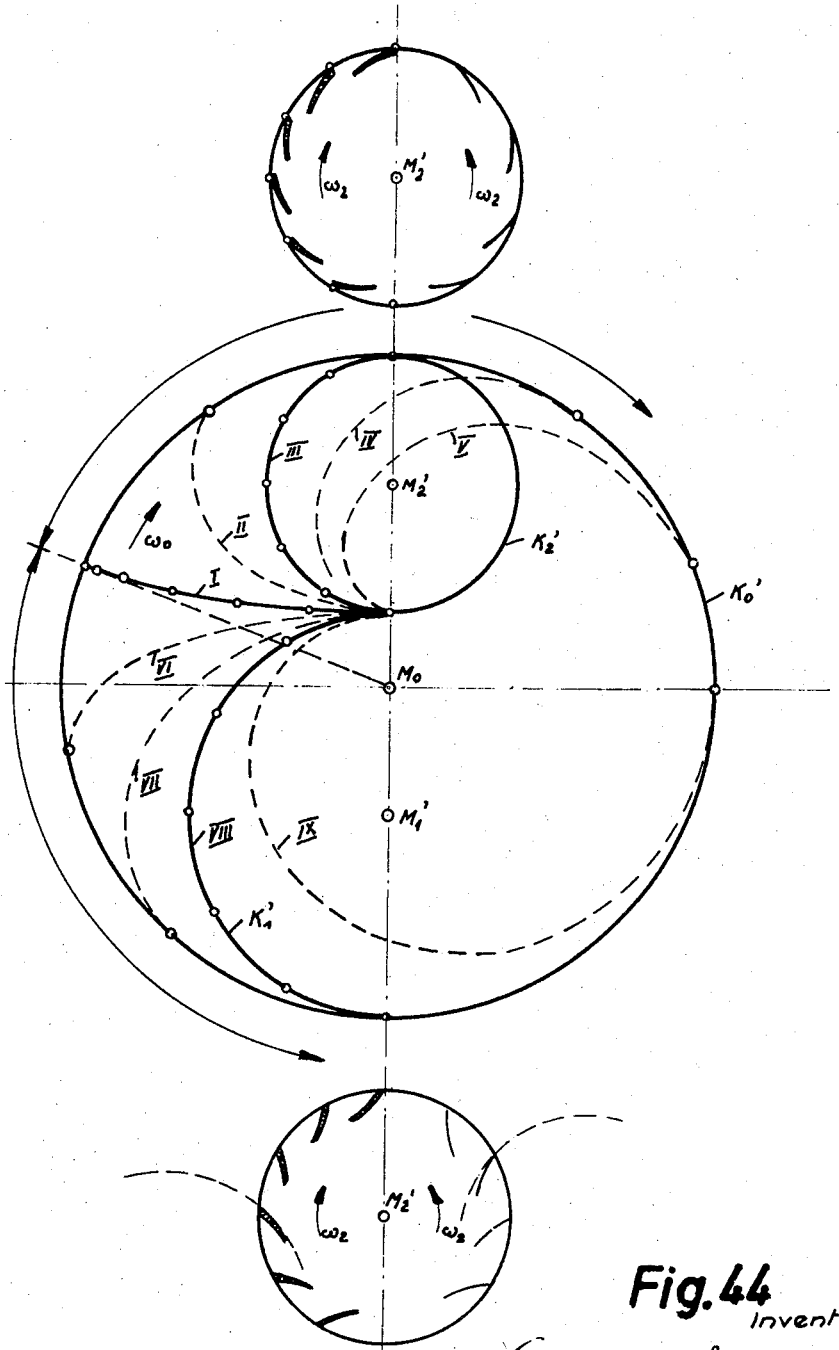

Figs. 30 and 31 schematically illustrate production of gearwheels having straight and curved teeth profiles respectively, Fig. 32 through 40 graphically illustrate the generatino of arc-like teeth, Fig. 41 graphically shows the production of arc-like teeth using a face mill with any number of teeth, Fig. 42 schematically illustrates the cutting of spherical tooth flanks, and Figs. 43 and 44 graphically and schematically illustrate conventional methods for producing cycloidally curved hypoid teeth.

(b) For maximum quietness of running spiral teeth are essential, since they overlap one another best because of their concave and convex tooth flanks and engage with one another like a worm gear. The tooth system must be produced in accordance with a theoretically correct principle in order that errors which occur in the tooth system during production may be kept to a minimum.

It must be possible to grind the tooth system after heat treatment in order that all roughness, unevenness and heat-treatment deformation may be removed and very great accuracy achieved.

(c) Complete interchangeability is possible only if the wheels are produced in accordance with a theoretically correct principle. The gear-cutting machine must be simple in order that it may be repeatedly returned to the same setting.

It must be possible to grind heat treated wheels to ensure very great accuracy and uniformity of tooth shape and tooth direction.

Inspection of the tooth shape and tooth direction is essential for complete interchangeability. Inspection, even of spiral teeth, can be performed more particularly with a testing device as disclosed by German specification No. 932,989.

(d) Minimum production time is ensured with continuous cutting with a face milling cutter.

To fulfill the requirements mentioned in the foregoing, the tooth system must be arcuate or substantially arcuate if it is to be ground with cup wheels after heat treatment, and the teeth must be cut by the continuous generating method.

The technical problem is therefore to provide a method for producing an arcuate or substantially arcuate tooth system by continuous generation.

*Solution of the technical problem*

*The spiral tooth.*—Before dealing with continuous hobbing the spiral tooth requires to be described in greater detail to clarify a number of conditions which must be complied with. In Fig. 2 the bevel wheel is inclined by the pitch cone angle $\delta$ to the plane of the face gear, while the tool (face milling cutter) and the cradle are in the plane of the face gear or parallel with the latter plane. Hence teeth with a parallel tooth depth are produced, and the tooth flanks produced correspond to the theoretical tooth flank.

In Fig. 3 the bevel wheel is again inclined by the pitch cone angle to the plane of the face gear and the cradle is again parallel with the plane of the face gear, but the tool (face milling cutter) has been additionally pivoted out of the plane of the face gear by the root angle $\delta_f$ in order that teeth extending conically to the cone centre may be produced. However, the additional pivoting of the tool through the root angle $\delta_f$ causes errors in the tooth profile. The resultant tooth profile does not coincide with the theoretical profile.

This is clearly apparent from Fig. 3. As a result, the corners of the teeth are overloaded. The face milling cutter can be pivoted only through a constant root angle. The mean root angle is assumed for this purpose but in fact the angle should change constantly, since it depends upon the incline angle of the teeth which is also constantly changing.

In Fig. 4 the chain lines denote a pair of bevel wheels running, for instance, at 90° to one another. The positions of the tools and cradle are also shown. It will be apparent that the face gears for the pinion and wheel coincide, since the cradle centres are perpendicular to the plane of the face gear and so are the tools, for their axes extend in the same direction. This setting corresponds to the setting shown in Fig. 2. The tooth system is being produced in accordance with a theoretical principle. For instance, if the angle of action is assumed to be 20°, then in Figures 2 and 4 the angle of action in the generating cones is 20°.

Fig. 5 shows the same wheels in chain lines and also shows the settings of the machine cradles and of the tools fastened thereon in relation to the position of the wheel. Here again the face gears of the pinion and wheel coincide, for the cradle centres are again perpendicular to the plane of the face gear. However, the tools do not coincide, for their axes do not extend in one direction but intersect at the point P. As a result, variations are produced in the angle of action. For instance, if the angle of intersection in the tool is 20°, the angle of 20° is produced in the root cone of the wheels and not in the generating cone. Fig. 5 corresponds to the production method shown in Fig. 3.

Other settings of the machine and tools are possible but will not be described until later on.

If the spiral tooth is to be produced with uniform tooth depth and substantially equal tooth thickness over the width of the tooth, the arcuate member used to form the tooth must be chosen within fairly close limits.

In Fig. 6 the spiral tooth is denoted by the hatched area. The blank is bounded internally and externally by the radii $Ri$ and $Ra$ respectively. The arcs of radius $r_1$ which envelope the tooth flanks form a half-moon. The outer normal pitch $t_{na}$ and the inner normal pitch $t_{nl}$ are determined by the thickness of the half-moon in these regions. It will be apparent that the outer normal pitch $t_{na}$ is greater than the inner normal pitch $t_{nl}$. Correspondingly, the outer tooth thickness $s_a$ is greater than the inner thickness $s_i$. The tooth depth is uniform. The addendum is conical in extent and the tooth is more acute inwardly at the top.

If the tooth is to have substantially equal tooth thickness, that part of the half-moon shown hatched in Fig. 7 will be used to form the gearwheel. Using the centre of the half-moon as the starting point, the tooth width has been distributed from this centre to both sides correctly. The outer and inner normal pitches are therefore equal, that is, $t_{na}=t_{nl}=t_n$, and correspondingly the outer and inner tooth thicknesses are equal, that is, $s_a=s_i=s$.

Tooth depth is again uniform and the top surface is substantially parallel, so that the tooth has a satisfactory appearance.

The tooth-forming method shown in Fig. 7 is not restrictive, and within certain limits there is a free choice of that part of the half-moon which can be used for forming the tooth, the part chosen depending upon the kind of production chosen, the correction and the required shaping.

Figure 8:
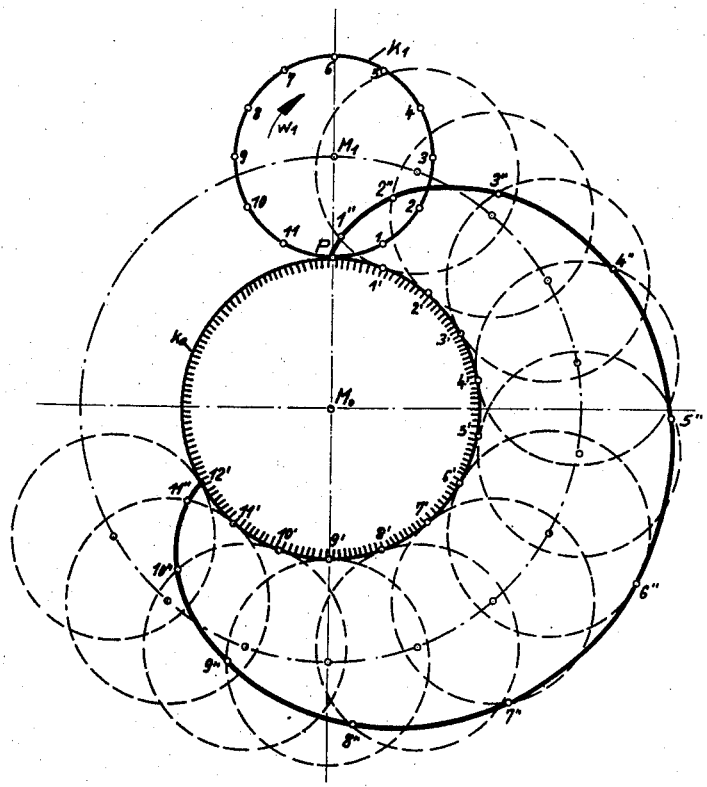

The continuous hobbing of spiral teeth having cycloidal flank lines is performed nowadays along the following lines:

(a) *The production of the flank lines.*—Referring to Fig. 8, if the circle $K_1$ rolls on the stationary circle $K_0$ without sliding, the points 1, 2, 3 and so on of the circle $K_1$ will engage seriatim with the points 1', 2', 3' and so on of the circle $K_0$, the point P of the circle $K_1$ describing the epicycloid 1", 2", 3" and so on. The circle $K_1$ rotates about its centre $M_1$ and the centre $M_1$ rotates about the centre $M_0$ at a distance $(M_0M_1)$ therefrom.

Figure 9:
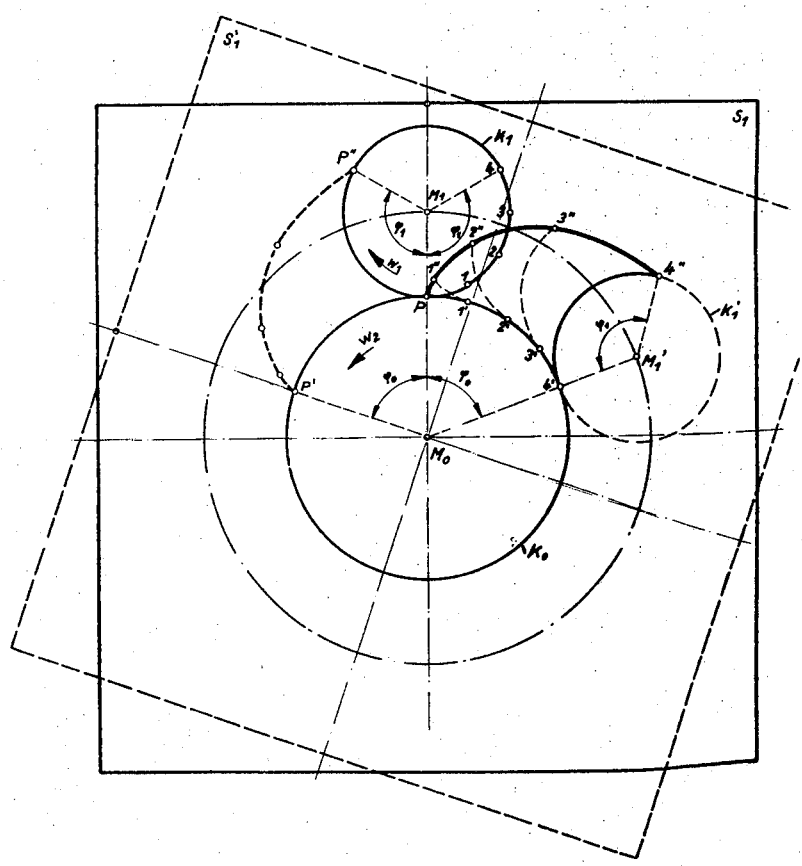

The same result is obtained if the movements are as follows:

Referring to Fig. 9, if the circle $K_1$ rolls upon the initially stationary circle $K_0$ without sliding so that the points 1, 2, 3, 4 of the circle $K_1$ engage seriatim with the points 1', 2', 3', 4' of the circle $K_0$, a pencil attached to the circle $K_1$ at the point P will trace the epicycloid 1", 2", 3", 4" in the lower and likewise stationary system $S_1$. During this operation, the circle $K_1$ turns to the right through the angle $\varphi_1$ around its centre $M_1$ and the arm $M_0M_1$, which guides the circle $K_1$ at the correct distance from the centre $M_0$, also rotates to the right through the angle $\varphi_0$ around the centre $M_0$.

The movements performed by the various members are as follows:

Arm $(M_0M_1) = +\varphi_0$ (around $M_0$)
Circle $K_1$ $= +\varphi_1$ (around $M_1$)
Circle $K_0$ $= + 0$ (around $M_0$)
System $S_1$ $= 0$ (around $M_0$)

If the whole structure is then locked so that the individual members cannot move relatively to one another and rotated in this state through the angle $\varphi_0$ around the centre $M_0$ to the left, the movements of the individual members during rotation are as follows:

Arm $(M_0M_1) = -\varphi_0$ (around $M_0$)
Circle $K_1$ $= 0$ (around $M_1$)
Circle $K_0$ $= -\varphi_0$ (around $M_0$)
System $S_1$ $= -\varphi_0$ (around $M_0$)

The total movements are as follows:

| Member | | 1st movement | + | 2nd movement | = | Total movement |
|---|---|---|---|---|---|---|
| Arm $(M_0M_1)$ | = | $+\varphi_0$ | + | $(-\varphi_0)$ | = | 0 (around $M_0$) |
| Circle $+_1$ | = | $+\varphi_1$ | + | 0 | = | $=+\varphi_1$ (around $M_1$) |
| Circle $K_0$ | = | 0 | + | $(-\varphi_0)$ | = | $-\varphi_0$ (around $M_0$) |
| System $S_1$ | = | 0 | + | $(-\varphi_0)$ | = | $-\varphi_0$ (around $M_0$) |

That is to say, if the circle $K_1$ turns to the right through the angle $\varphi_1$ around its centre $M_1$, while the circle $K_0$ and system $S_1$ rotate to the left through the angle $\varphi_0$ around the centre $M_0$, a pencil secured to the circle $K_1$ at the point P will trace the epicycloid shown in chain-lines in the system $S_1'$. The system $S_1'$ then assumes the position shown in chain-lines and the arm $(M_0M_1)$ has not rotated at all. Since the circles $K_1$ and $K_0$ roll upon one another without sliding, they therefore rotate around their centres $M_1$ and $M_0$ at identical peripheral speeds.

The lengths of arc over which the circles have rolled are identical, thus giving the equation:

$$b_0 = b_1$$

$$r_0 \cdot \text{arc } \varphi_0 = r_1 \cdot \text{arc } \varphi_1$$

$$\frac{r_0}{r_1} = \frac{\text{arc } \varphi_1}{\text{arc } \varphi_0}$$

where:

$b_0$ = the arc over which the circle $K_0$ has rolled
$b_1$ = the arc over which the circle $K_1$ has rolled
$r_0$ = the radius of the circle $K_0$
$r_1$ = the radius of the circle $K_1$
$n_0$ is the speed (number of turns) of the circle $K_0$
$n_1$ is the speed (number of turns) of the circle $K_1$ Since the peripheral speeds $V_0$ and $V_1$ are equal to one another, then:

$$V_0 = \frac{2r_0 \cdot \pi \cdot n_0}{60}$$

$$V_1 = \frac{2r_1 \cdot \pi \cdot n_1}{60}$$

$$V_0 = V_1 = r_0 \cdot \frac{\pi \cdot n_0}{30} = \frac{r_1 \cdot \pi \cdot n_1}{30}$$

and therefore $$\frac{r_0}{r_1} = \frac{n_1}{n_0}$$

or if $$\frac{\pi \cdot n_0}{30} = \omega_g \text{ and } \frac{\pi \cdot n_1}{30} = \omega_1$$

then $$r_0 \cdot \omega_0 = r_1 \cdot \omega_1$$

$$\frac{r_0}{r_1} = \frac{\omega_1}{\omega_0}$$

that is, if the peripheral speeds of the circles $K_0$ and $K_1$ are equal to one another ($V_0 = V_1$), the radii of the circles are in inverse proportion to the angular velocities, that is, to the speeds of rotation of the circles.

Figure 10:
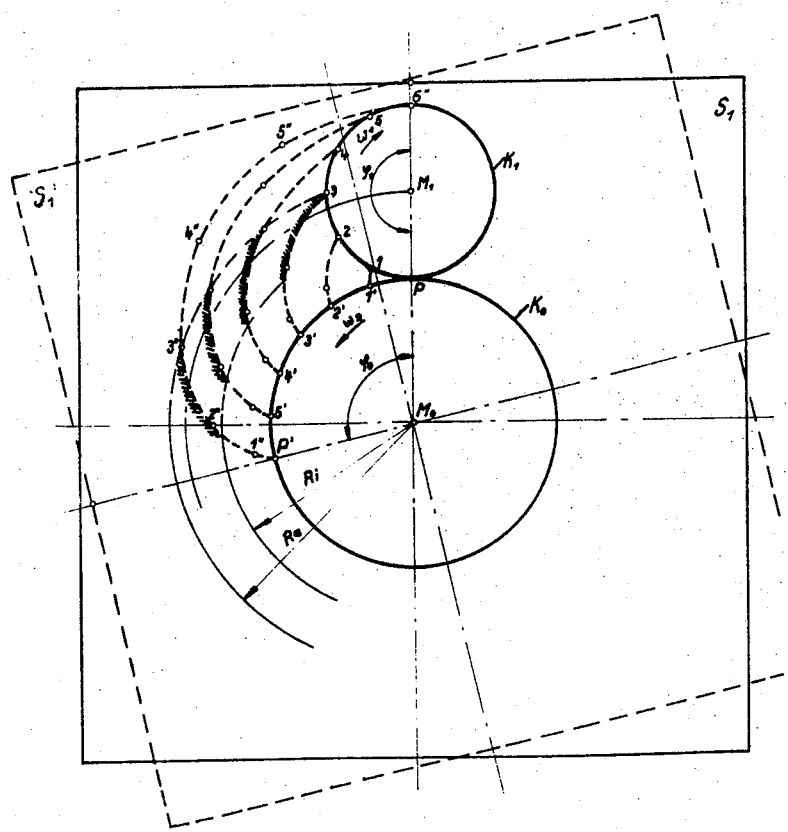

Assuming that one pencil is attached to each of the points P, 1, 2, 3, 4, 5 and 6″ of the circle $K_1$ in Fig. 10 they will draw in the system $S_1'$ the epicycloids shown in chain-lines if the circle $K_1$ rotates to the right through the angle $\varphi_1$ around its centre $M_1$ and the circle $K_0$ and system $S_1$ rotate to the left through the angle $\varphi_0$ around their centre $M_0$. These epicycloids are all identical in shape, but it is not the same cycloid which is drawn, each pencil drawing a different cycloid and the cycloids being separated from one another by equal distances in the system $S_1'$.

If cutting tools are used instead of the pencils, they will cut in the system $S_1'$ the epicycloids on which the hatched parts represent the flank lines of cycloid teeth of a gearwheel defined in the system $S_1'$ by the radii $R_i$ and $R_a$.

Since each tool cuts a cycloid the teeth in the gearwheel are produced continuously, that is, by continuous cutting.

Referring to Fig. 10, the circle $K_1$ and tools rotate to the right about the centre of the circle $K_1$, while the system $S_1$ rotates to the left about its centre $M_0$. Moreover, the directions of rotation of the circle $K_1$ and the system $S_1$ can be inverted. The only difference will be that the tools cut from the other side, as will be apparent from Fig. 12.

Figure 11:
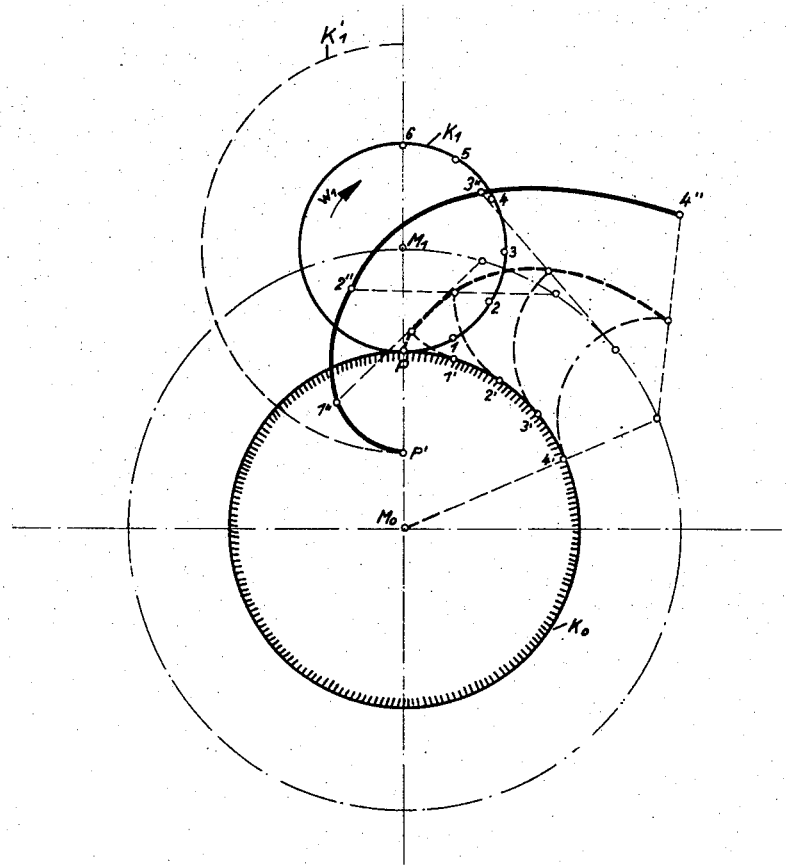

In continuous hobbing it is usual to use elongated cycloids, for instance, of the type shown in Fig. 11, for tooth formation.

Referring to Fig. 11, if the circle $K_1$ so rolls without sliding upon the stationary circle $K_0$ that the points 1, 2, 3, 4 and so on of the circle $K_1$ engage seriatim with the points 1′, 2′, 3′, 4′ and so on of the circle $K_0$, a point P′ outside the circle $K_1$ will describe the elongated epicycloid P′, 1″, 2″, 3″, 4″, as shown in Fig. 11. The point P′ then lies, for instance, upon a circle $K_1'$ having its centre at $M_1$.

Figure 12:
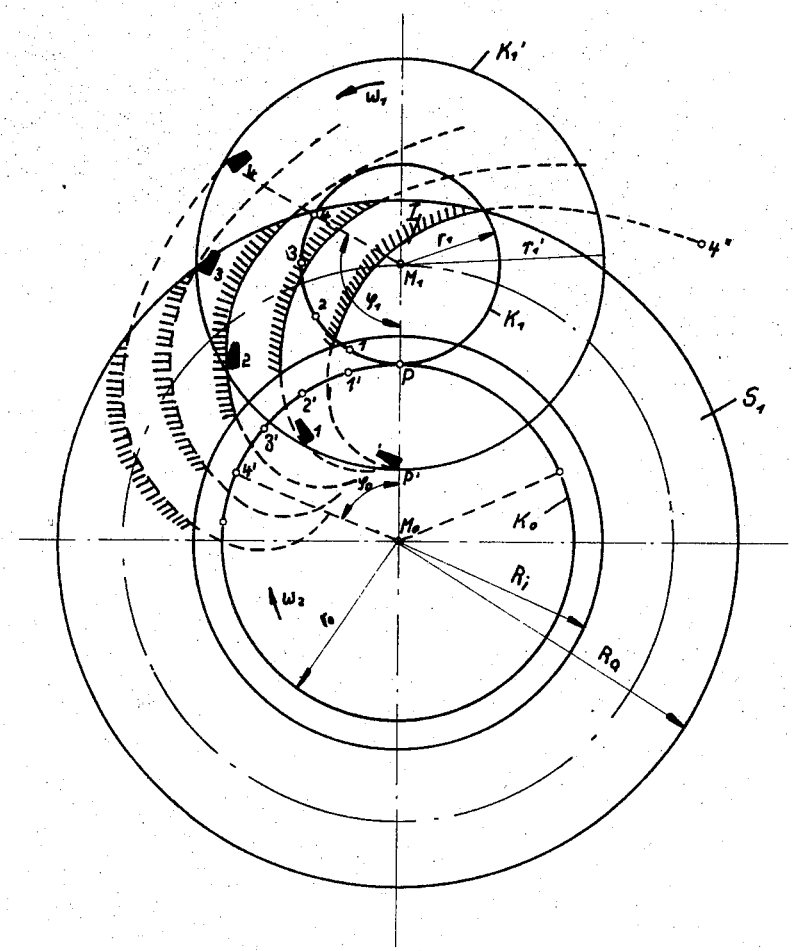

The circle $K_1'$ is used as the tool circle and the tools are fitted as shown in Fig. 12. If the tool circle $K_1$ rotates to the left through the angle $\varphi_1$ around its centre $M_1'$ while the system $S_1$ rotates to the right through the angle $\varphi_0$ around its centre $M_0$, the tool of the circle $K_1'$ at the point 4 passes through the epicycloidal track illustrated and cuts the epicycloidal track I in the system $S_1$. All the tools fitted to the circle $K_1'$ cut an identical cycloidal track in the system $S_1$ but a certain distance from the cycloidal track. This distance between the cycloids is determined by the distance between the tools fitted to the circle $K_1'$.

The circles $K_1$ and $K_0$ move at the same peripheral speed during these operations, that is, these circles run upon one another, without sliding, at identical speeds.

It was explained with reference to Fig. 9 that the radii of the circles of equal peripheral speeds are inversely proportional to the angle through which the circles have turned, that is, inversely proportional to the angular velocities of the circles.

Similar considerations also apply to Fig. 12 where:

$$\frac{r_0}{r_1} = \frac{\text{arc } \varphi_1}{\text{arc } \varphi_0}$$

If the arcs through which the circle rolls are identical, that is $b_0 = b_1$, or $$\frac{r_0}{r_1} = \frac{\omega_1}{\omega_0}$$

the peripheral speeds are identical, that is, $V_0 = V_1$. In the system $S_1$ shown in Fig. 12, only the circle defined as the circle $K_0$ has the peripheral velocity $V_0$. In all the other circles of the systems $S_1$ the speed is greater or less than $V_0$, depending upon whether the circle is greater or less than $K_0$. But since the speed $V_1'$ of the tool circle $K_1'$ always remains the same, the speed ratio of this circle to the other circles of the system $S_1$ is important.

This will now be explained with reference to Fig. 13.

The circles $K_1$ and $K_0$ rotate at identical peripheral speeds. The peripheral speed $V_1$ of the tool circle $K_1'$ remains constant. Those circles of the system $S_1$ which are different from $K_0$ rotate at different speeds.

Figure 13:
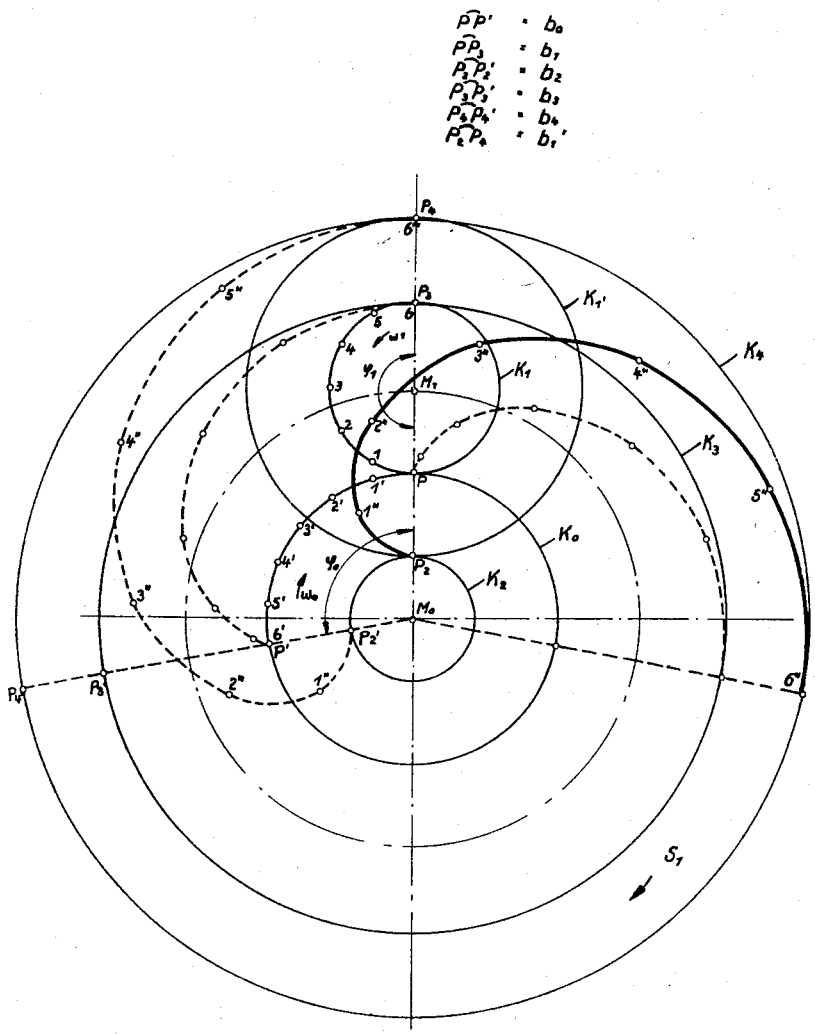

According to Fig. 13:

$$b_1 = r_1 \cdot \text{arc } \varphi_1$$

$$b_1' = r_1' \cdot \text{arc } \varphi_1$$

$$\frac{b_1'}{b_1} = \frac{r_1'}{r_1}$$

$$\frac{b_1'}{b_1} = \frac{r_1'}{r_1}; \ b_1' = \frac{r_1'}{r_1} \cdot b_1$$

also:

$$b_0 = r_0 \cdot \text{arc } \varphi_0$$

$$b_2 = r_2 \cdot \text{arc } \varphi_0$$

$$b_3 = r_3 \cdot \text{arc } \varphi_0$$

$$b_4 = r_4 \cdot \text{arc } \varphi_0$$

$$\frac{b_2}{b_0} = \frac{r_2}{r_0} = \frac{r_2}{r_0}; \ b_2 = \frac{r_2}{r_0} \cdot b_0$$

$$\frac{b_3}{b_0} = \frac{r_3}{r_0} = \frac{r_3}{r_0}; \ b_3 = \frac{r_3}{r_0} \cdot b_0$$

$$\frac{b_4}{b_0} = \frac{r_4}{r_0} = \frac{r_4}{r_0}; \ b_4 = \frac{r_4}{r_0} \cdot b_0$$

It therefore follows that:

$$\frac{b_2}{b_1'} = \frac{r_2 \cdot b_0 \cdot r_1}{r_0 b_1 \cdot r_1'}$$

since the arcs $b_0$ and $b_1$ are equal, therefore $$\frac{b_2}{b_1'} = \frac{r_2}{r_1'} \cdot \frac{r_1}{r_1} = \frac{r_2 \cdot \text{arc } \varphi_0}{r_1' \cdot \text{arc } \varphi_1}$$

$$\frac{b_3}{b_1'} = \frac{r_3}{r_1'} \cdot \frac{r_1}{r_0} = \frac{r_3 \cdot \text{arc } \varphi_0}{\text{arc } \varphi_1}$$

$$\frac{b_4}{b_1'} = \frac{r_4}{r_1'} \cdot \frac{r_1}{r_0} = \frac{r_4 \cdot \text{arc } \varphi_0}{r_1' \cdot \text{arc } \varphi_1}$$

Replacing the arcs by the peripheral speeds, then:

$$V_0 = r_0 \cdot \omega_0$$
$$V_1 = r_1 \cdot \omega_1$$
$$V_2 = r_2 \cdot \omega_0$$
$$V_3 = r_3 \cdot \omega_0$$
$$V_4 = r_4 \cdot \omega_0$$
$$V_1' = r_1' \cdot \omega_1$$

If $V_0 = V_1$, then:

$$r_0 \cdot \omega_0 = r_1 \cdot \omega_1$$

$$\frac{r_1}{r_0} = \frac{\omega_0}{\omega_1}$$

$$\frac{V_0}{V_1'} = \frac{r_0 \cdot \omega_0}{r_1' \cdot \omega_1} = \frac{r_0}{r_1'} \cdot \frac{r_1}{r_0}$$

$$\frac{V_3}{V_1'} = \frac{r_3 \cdot \omega_0}{r_1' \cdot \omega_1} = \frac{r_3}{r_1'} \cdot \frac{r_1}{r_0}$$

$$\frac{V_2}{V_1'} = \frac{r_2 \cdot \omega_0}{r_1' \cdot \omega_1} = \frac{r_2}{r_1'} \cdot \frac{r_1}{r_0}$$

$$\frac{V_4}{V_1'} = \frac{r_4 \cdot \omega_0}{r_1' \cdot \omega_1} = \frac{r_4}{r_1'} \cdot \frac{r_1}{r_0}$$

The conditions governing the production of epicycloids have been explained with reference to Figs. 8 to 13. The same considerations also apply to pericycloids and hypocycloids.

Figure 14:
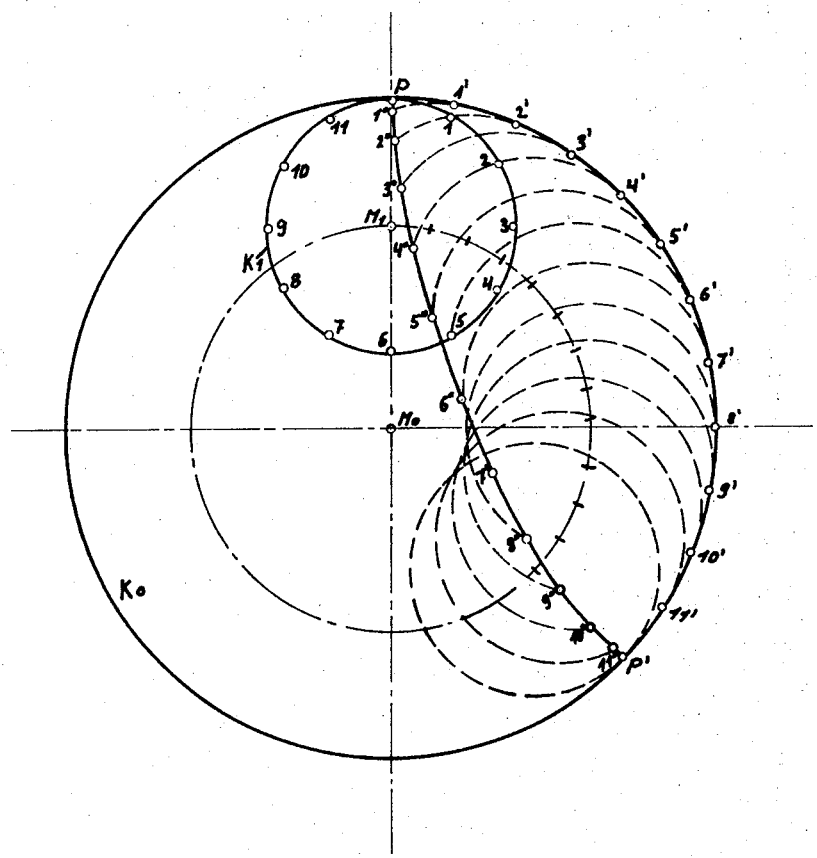

The conditions governing hypocycloids will be dealt with again here. Referring to Fig. 14, if the circle $K_1$ rolls without sliding upon the stationary cycle $K_0$ so that the points 1, 2, 3 and so on of the circle $K_1$ engage seriatim with the points 1', 2', 3' and so on of the circle $K_0$, the points P of the circle $K_1$ will describe the illustrated hypocycloid P, P'.

Figure 15:
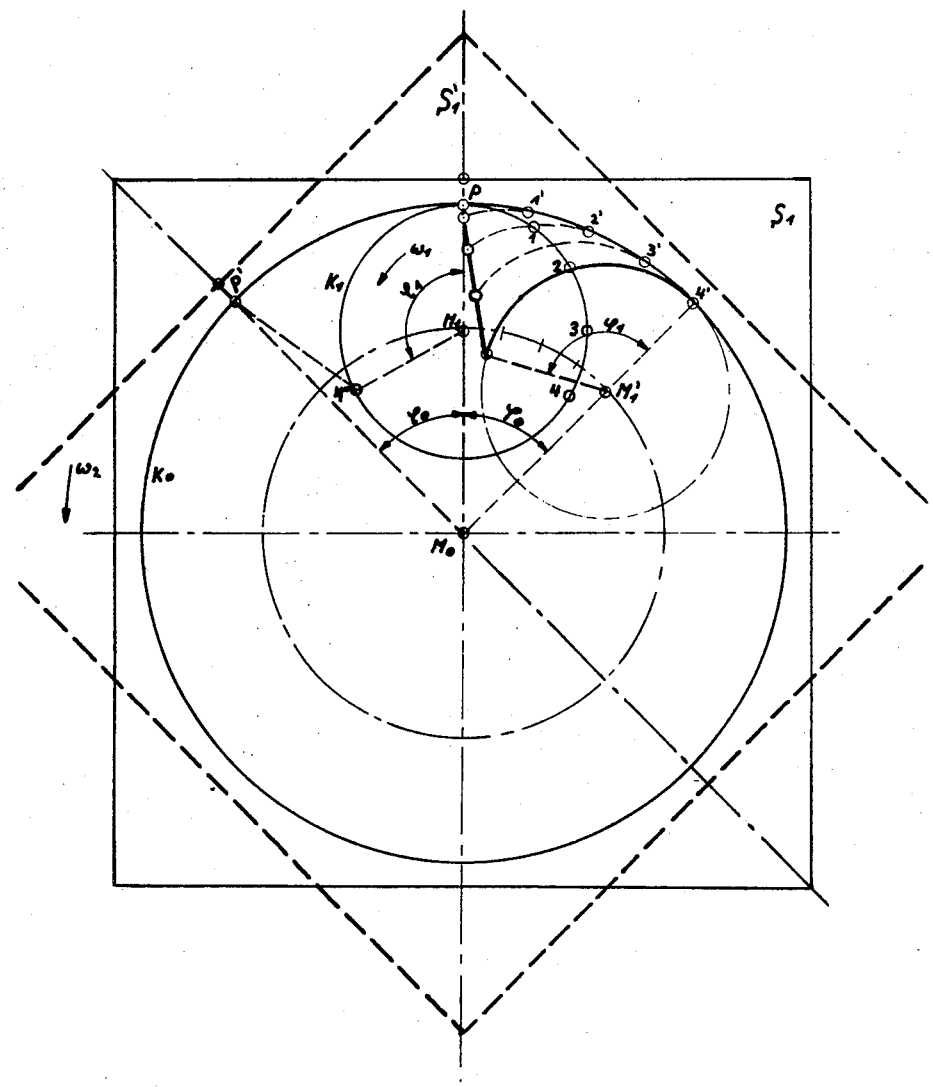

The same result is obtained if the movements are as follows:

Referring to Fig. 15, if the circle $K_1$ rolls on the initially stationary circle $K_0$ so that the points 1, 2, 3 and 4 of the circle $K_1$ engage seriatim with the points 1', 2', 3' and 4' of the circle $K_0$, a pencil secured to the circle $K_1$ at the point P will describe a hypocycloid extending from point P' to point 4'' in the lower and also stationary system $S_1$.

The individual members perform the following movements:

Arm $(M_0M_1) = +\varphi_0$ (around $M_0$)
Circle $K_1$ $= -\varphi_1$ (around $M_1$)
Circle $K_0$ $= 0$ (around $M_0$)
System $S_1$ $= 0$ (around $M_0$)

If the whole structure is now set so that the individual members cannot rotate relatively to one another and then rotated while locked around the centre $M_0$ through the angle $\phi_0$ to the left, the individual members will perform the following movements:

Arm $(M_0M_1) = -\varphi_0$ (around $M_0$)
Circle $K_1$ $= 0$ (around $M_1$)
Circle $K_0$ $= -\varphi_0$ (around $M_0$)
System $S_1$ $= -\varphi_0$ (around $M_0$)

The total movement is therefore as follows:

| Member | 1st movement | +2nd movement | = Total movement |
|---|---|---|---|
| Arm $(M_0M_1)$ = | $+\varphi_0$ | + $(-\varphi_0)$ | = 0 (around $M_0$) |
| Circle $K_1$ = | $-\varphi_1$ | + 0 | = $-\varphi_1$ (around $M_1$) |
| Circle $K_0$ = | 0 | + $(-\varphi_0)$ | = $-\varphi_0$ (around $M_0$) |
| System $S_1$ = | 0 | + $(-\varphi_0)$ | = $-\varphi_0$ (around $M_0$) |

Figure 16:
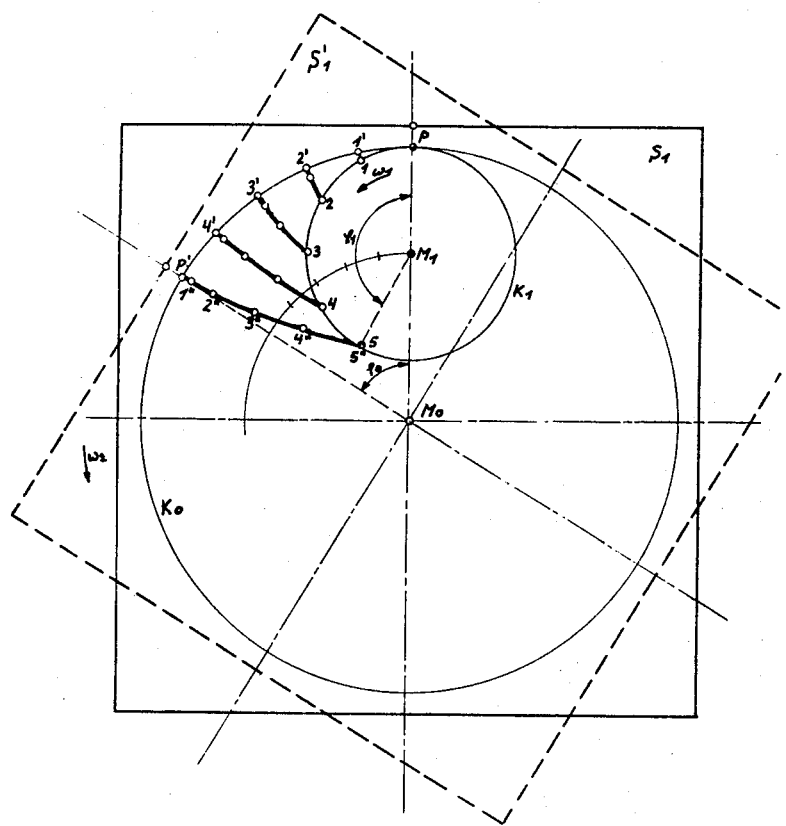
Figure 17:
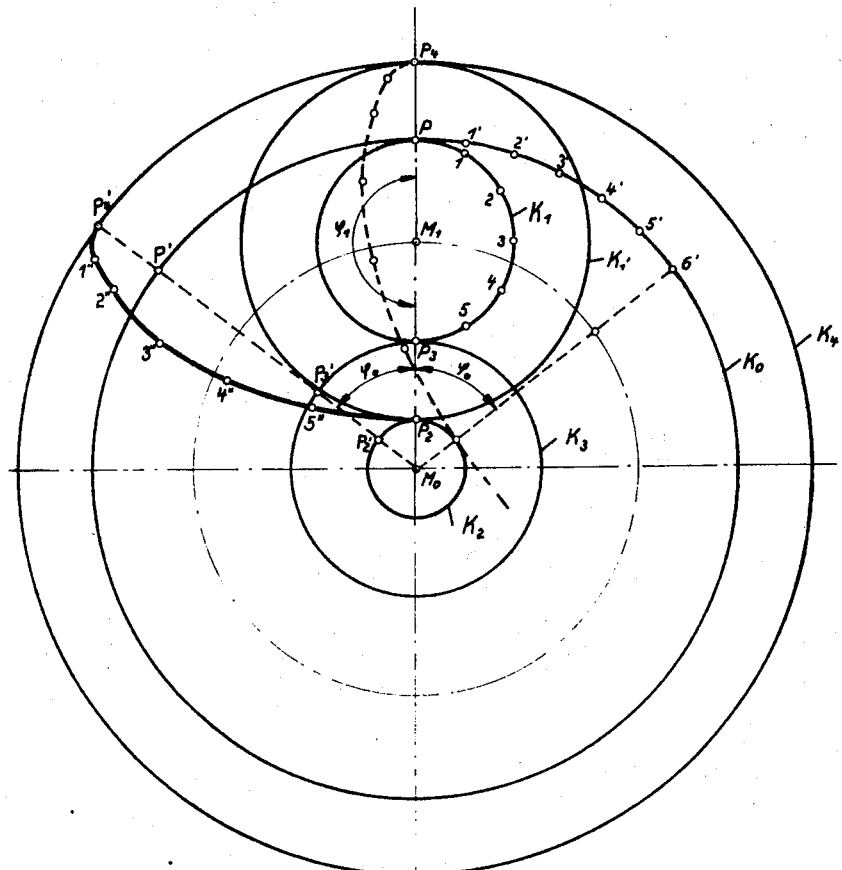

Hence, if the circle $K_1$ rotates to the left through the angle $\varphi_1$ around its centre and the circle $K_0$ and the system $S_1$ rotate to the left through the angle $\varphi_0$ around the centre $M_0$, the pencil attached to the centre $K_1$ at the point P will describe in the system $S_1$ the hypocycloid P'4'' shown in chainlines. After this rotation, the system $S_1$ takes up the position shown in chain-lines. Referring to Fig. 16, if a number of pencils are attached in spaced relationship to the circle $K_1$ as shown in Fig. 16, each pencil will describe in the system $S_1$ another hypocycloid of identical shape. Fig. 17 shows an elongated hypocycloid. The circles $K_1$ and $K_0$ are circles rotating at identical peripheral speed.

If the circle $K_1$ rolls on the circle $K_0$ in known manner, the point $P_4$ of the circle $K_1'$ will describe the elongated hypocycloid shown in chain-lines, for the circle $K_1$ and $K_1'$ are interconnected and perform identical rotations.

according to Fig. 17: $b_0 = r_0 \cdot \text{arc } \varphi_0$
$b_1 = r_1 \cdot \text{arc } \varphi_1$
$b_2 = r_2 \cdot \text{arc } \varphi_0$
$b_3 = r_3 \cdot \text{arc } \varphi_0$
$b_4 = r_4 \cdot \text{arc } \varphi_0$
$b_1' = r_1'' \cdot \text{arc } \varphi_1$ $$\frac{b_1'}{b_1} = \frac{r_1'}{r_1}$$

$$b_1' = \frac{r_1'}{r_1} \cdot b_1$$

Since $b_0 = b_1$ then:

$$b_0 = b_1 = r_0 \cdot \text{arc } \varphi_0 = r_1 \cdot \text{arc } \varphi_1$$

$$\frac{\text{arc } \varphi_0}{\text{arc } \varphi_1} = \frac{r_1}{r_0}$$

$$\frac{b_2}{b_1'} = \frac{r_2 \cdot \text{arc } \varphi_0}{r_1' \cdot \text{arc } \varphi_1} = \frac{r_2 \cdot r_1}{r_1' \cdot r_0}$$

$$\frac{b_3}{b_1'} = \frac{r_3 \cdot \text{arc } \varphi_0}{r_1 \cdot \text{arc } \varphi_1} = \frac{r_3 \cdot r_1}{r_1 \cdot r_0}$$

$$\frac{b_4}{b_1'} = \frac{r_4 \cdot \text{arc } \varphi_0}{r_1' \cdot \text{arc } \varphi_1} = \frac{r_4 \cdot r_1}{r_1' \cdot r_0}$$

Replacing the arcs by the peripheral speeds, then:

$$V_0 = r_1 \cdot \omega_0$$
$$V_1 = r_1 \cdot \omega_1$$
$$V_2 = r_2 \cdot \omega_0$$
$$V_3 = r_3 \cdot \omega_0$$
$$V_4 = r_4 \cdot \omega_0$$
$$V_1' = r_1' \cdot \omega_1$$

If $V_0 = V_1$ then:

$$r_0 \cdot \omega_0 = r_1 \cdot \omega_1$$

$$\frac{r_1}{r_0} = \frac{\omega_0}{\omega_1}$$

and $$\frac{V_2}{V_1'} = \frac{r_2 \cdot \omega_0}{r_1' \cdot \omega_1} = \frac{r_2}{r_1'} \cdot \frac{r_1}{r_0}$$

$$\frac{V_3}{V_1'} = \frac{r_3 \cdot \omega_0}{r_1' \cdot \omega_1} = \frac{r_3}{r_1'} \cdot \frac{r_1}{r_0}$$

$$\frac{V_4}{V_1'} = \frac{r_4 \cdot \omega_0}{r_1' \cdot \omega_1} = \frac{r_4}{r_1'} \cdot \frac{r_1}{r_0}$$

If the radii of Fig. 17 are given the following values: $r_1 = 2$ cm., $r_2 = 1$ cm., $r_3 = 2.5$ cm., $r_4 = 8$ cm., $r_1' = 3.5$ cm., $r_0 = 6.5$ cm.

then:

$$\frac{V_2}{V_1'} = \frac{r_2}{r_1'} \cdot \frac{r_1}{r_0} = \frac{1}{3.5} \cdot \frac{2}{6.5} = \frac{2}{22.75} = 0.0879; \; V_2 = 0.0879 \cdot V_1'$$

$$\frac{V_3}{V_1'} = \frac{r_3}{r_1'} \cdot \frac{r_1}{r_0} = \frac{2.5}{3.5} \cdot \frac{2}{6.5} = \frac{5}{22.75} = 0.2197; \; V_3 = 0.2197 \cdot V_1'$$

$$\frac{V_4}{V_1'} = \frac{r_4}{r_1'} \cdot \frac{r_1}{r_0} = \frac{8}{3.5} \cdot \frac{2}{6.5} = \frac{16}{22.75} = 0.7032; \; V_4 = 0.7032 \cdot V_1'$$

The speeds and shapes of the cycloids depend upon the size of the circles chosen.

The elongated epicycloid shown in Fig. 12 and from the elongated hypocycloid shown in Fig. 17, it will be apparent that the elongated epicycloid is better adapted to tooth formation because it has greater curvatures in the region used for tooth formation than the elongated hypocycloid.

Fig. 17 shows that the ratio between the speeds of the circle $K_4$ to the tool circle $K_1'$ is equal to $$\frac{V_4}{V_1}=0.7032$$

If this speed ratio is altered so that $$\frac{V_4}{V_1}$$

is unity, the point $P_4$ of the circle $K_4$ will not describe an elongated hypocycloid but an ordinary hypocycloid starting at the point $P_4$ of the circle $K_4$. In this case, however, the circles $K_1'$ and $K_4$ would rotate at equal speeds and not the circles $K_1$ and $K_0$.

Figure 18:
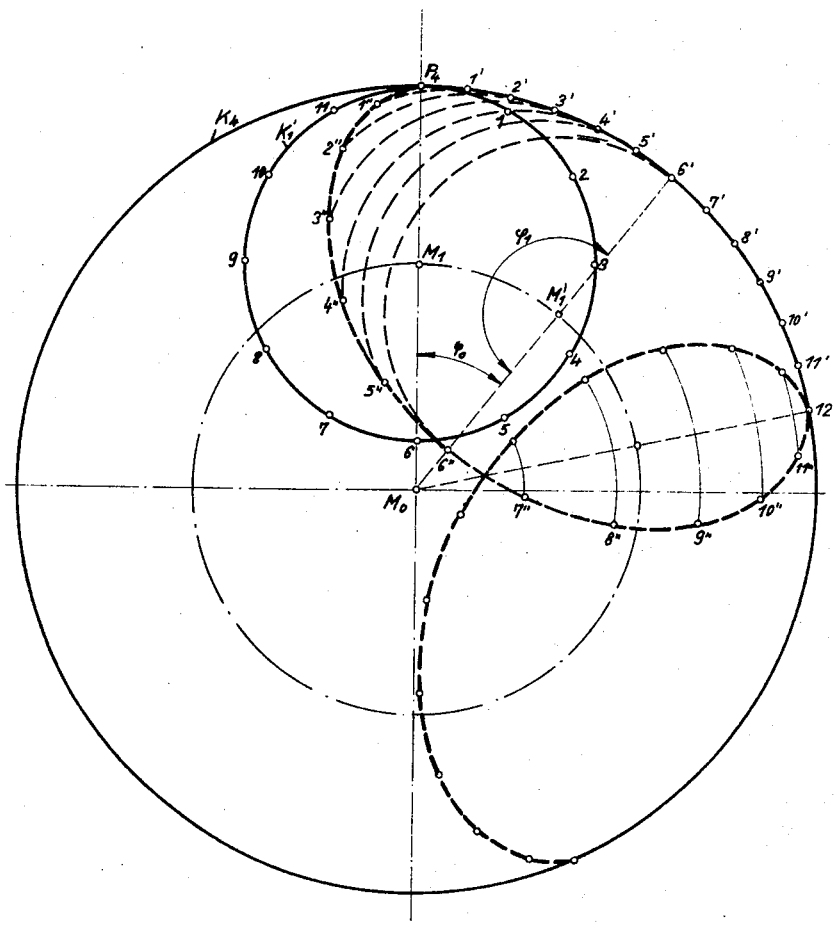

If the speed ratio $$\frac{V_4}{V_1} \text{ of the circle } K_1' \text{ and } K_4 = \frac{1}{2}$$

the point $P_4$ of the circle $K_4$ will describe the elongated hypocycloid shown in Fig. 18, provided that the circle $K_1'$ runs and slides at the same time on the circle $K_4$ so that the points 1, 2, 3 and so on of the circle $K_1'$ engage seriatim with the points 1', 2', 3' and so on of the circle $K_4$.

Figure 19:
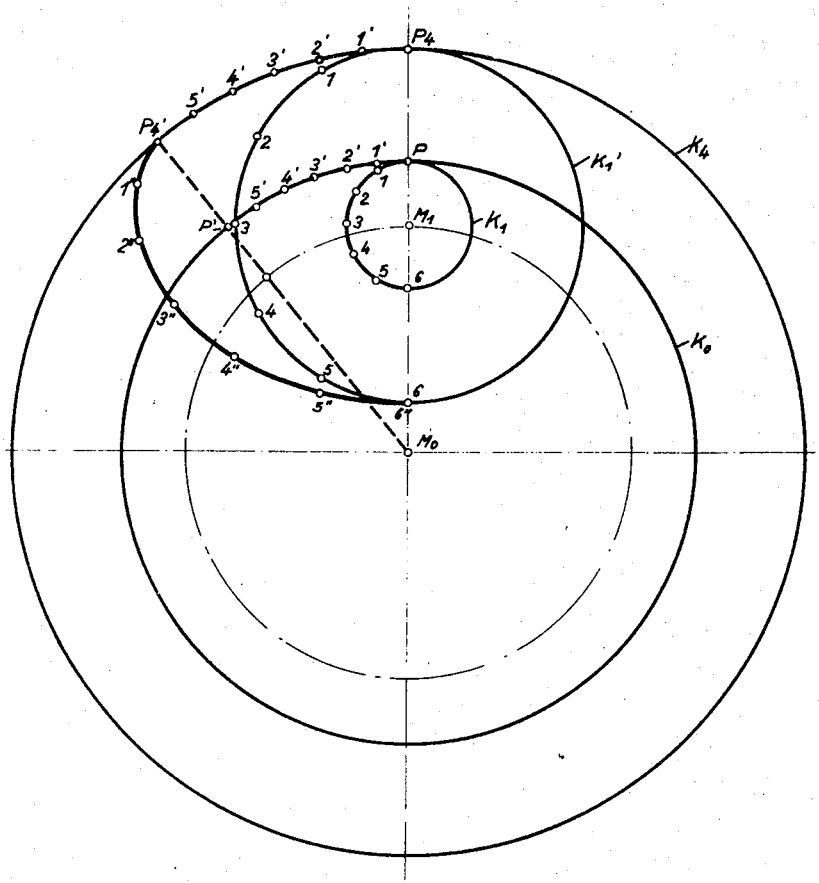

If the circle $K_1'$ rotates to the left through the angle $\varphi_1$ at the speed $V_1'$ around the centre $M_1$ and the system $K_4$ rotates, also to the left, through the angle $\varphi_0$ around the centre $M_0$ at the speed $V_4$ the same elongated hypocycloid will be described in the system $K_4$ by a pencil secured at the point $P_4$ to the circle $K_1$ (Fig. 19).

Circles of equal peripheral velocity can be calculated as follows:

$$\frac{V_4}{V_1'}=x=\frac{r_4}{r_1'}\cdot\frac{r_1}{r_0}$$

where $x$ denotes the assumed speed ratio of the circles $K_1$ and $K_4$, it follows $$r_1=x\frac{r_1'}{r_4}\cdot r_0$$

Also according to Fig. 19:

$$r_4-r_1'=a$$

$a$ being the mean distance between these two circles. Since the circles $K_1$ and $K_0$ of equal speed have the same centres as the circles $K_1'$ and $K_4$, then:

$$r_0-r_1=a$$
$$r_0=a+r_1$$

Hence:

$$r_1=x\cdot\frac{r_1}{r_4}(a+r_1)$$

In Fig. 19, if $r_4=8$ cm.
$r_1'=3.5$ cm., then:

$a=r_4-r_1=8-3.5=4.5$ cm.
$a=4.5$ cm.

$$r_1=x\cdot\frac{r_1}{r_4}(a+r_1)=x\frac{r_1'}{r_4}\cdot a+x\frac{r_1'}{r_4}\cdot r_1$$

$$r_1-x\frac{r_1'}{r_4}\cdot r_1=\frac{r_1}{r_4}\cdot a$$

$$r_1\left(1-x\frac{r_1}{r_4}\right)=x\frac{r_1'}{r_4}\cdot a$$

$$r_1=\frac{x\cdot r_1'\cdot a}{r_4\left(1-x\frac{r_1}{r_4}\right)}$$

$$r_1=\frac{r_1\cdot a}{\frac{r_4}{x}-r_1'}$$

If $$x=\frac{1}{2}$$

then:

$$r_1=\frac{3.5\cdot 4.5}{\frac{8}{1/2}-3.5}=\frac{15.75}{12.5}=1.26 \text{ cm.}$$

$r_1=1.26$ cm.
$r_0=a-r_1=4.5+1.26=5.76$
$r_0=5.76$ cm.

The circles $K_1$ and $K_0$ of equal speed have, according to Fig. 19, the radii:

$r_1=1.26$ cm. for the circle $K_1$ $r_0=5.76$ cm. for the circle $K_0$ (b) *The production of the tooth profile.*—Section (a) dealt merely with the production of the flank line of cycloidally curved teeth. So far, however, the tooth shape has not been formed and an additional generating movement is necessary. Referring to Fig. 20b, if the tool circle $K_1'$ is so adjusted that its centre engages with $M_1'$, the cutter starts to machine the tooth flanks at the point $P_a$. In this position, however, the cutter does not penetrate to the complete tooth depth in the gearwheel but, as is apparent from Fig. 20c, there is a reduction in tooth length. If the tool circle $K_1'$ rotates around its centre $M_1'$ through the angle $\varphi_1$ to the left and the workpiece rotates to the right through the angle $\varphi_0$ around its centre $M_0$, the point $P_1'$ of the tooth and the points $P_a$ of the tool meet at the point $P_1$. At the point $P_1$ the tool reaches the complete tooth depth, having cut spirally over the tooth flank as shown in Fig. 20d. However, for the complete tooth profile to be cut, these longitudinal cuts shown in Fig. 20d must be distributed over the whole depth of the tooth. To this end, the centre $M_1'$ must perform a further rotation around the centre $s_0$. Taking the centre $M_1$ of the tool circle $K_1'$ as the point corresponding to the beginning of machining, the outer top edge of the tooth is cut in this position 1. Hence while the tool circle $K_1'$ rotates to the left around its centre $M_1$ and the gearwheel continues to rotate to the right around its centre $M_0$, the centre $M_1$ of the tool circle $K_1'$ must be moved simultaneously around the centre $M_0$ from $M_1$ towards $M_1''$. The point $P_2$ is then the end position 3 in which the tooth profile has been completely hobbing. This hobbing movement is initiated by the cradle, to which the face milling cutter is secured, and which rotates around the axis through the angle $\varphi_\omega$. This rate of hobbing or hobbing feed must be borne in mind in the rotation of the gearwheel. As can be seen in Fig. 20b, the speed of the wheel must be reduced by the rate of generation because the wheel turns to the right and the cradle to the left around the centre at O.

Machining can be performed in two ways:

(1) The tool circle $K_1'$ is in the position 1 with its centre at $M_1$. While the wheel turns to the right around the centre $M_0$ and the tool turns to the left around the centre $M_1$ continuously, in the correct speed ratio, the tool while in this position penetrates to the complete tooth depth in the gearwheel. Generation begins only when full tooth depth has been reached, and the rotation of the wheel must be altered in the manner corresponding to the rate of generation.

(2) The hob feed is then engaged immediately, that is, generation begins as soon as machining begins. In this case the generating angle $\varphi_\omega$ must be increased towards the starting region in order that the tool position with the centre in $M_1$ is reached only when the tool has assumed a position corresponding to full tooth depth.

The method of cutting hypoid teeth using dividing as is nowadays conventional is as follows:

Referring to Fig. 12, if the tool circle $K_1'$ rotates to the left around its centre $M_1$ while the wheel rotates to the right around its centre $M_0$ and the tools secured to $K_1'$ cut cycloidal teeth in the blank, arcs should be able to be produced in a similar way.

It therefore follows that an arc must be produced if the arc to be produced and the tool describe a cycloidal path simultaneously.

Referring to Fig. 21, if the circle $K_1$ so rolls upon the stationary circle $K_0$ that the point 1, 2, 3 and so on of the circle $K_1$ engage seriatim with the point 1', 2', 3' and so on of the circle $K_0$, the point P of the circle $K_1$ describes the epicycloid shown in the figure. In this case, the circle $K_1$ is rotated to the right through the angle $\varphi_1$ around its centre $M_1$ and the arm $(M_0M_1)$, which guides the circle $K_1$ around the circle $K_0$, has rotated through the angle $\varphi_0$ to the right around its centre $M_0$. If the system $S_1$ also rotates to the right, through the angle $\varphi_0$, around its centre $M_0$, like the arm, a pencil secured to the circle $K_1$ at the point P will describe the epicycloid P, 1″, 2″–6″ in relation to a stationary system but, in relation to a rotating system $S_1$, the arc P, 1‴, 2‴–6 will be described. If the latter arc is traced in the system $S_1$, this arc will pass through the epicycloid simultaneously with the pencil secured to the circle $K_1$ at P. The movements performed by the individual members are as follows:

```
Arm (M0M1)  = +φ0 (around M0)
Circle K1   = +φ1 (around M1)
Circle K0   =   0 (around M0)
System S1   = +φ0 (around M0)
```

If this whole structure is now locked and turned around the centre $M_0$ through the angle $\varphi_0$ to the left, the individual members will move as follows during this return movement:

```
Arm (M0M1)  = −φ0 (around M0)
Circle K1   =   0 (around M1)
Circle K0   = −φ0 (around M0)
System S1   = −φ0 (around M0)
```

The total movements are:

| Member | 1st movement | +2nd movement | = Total movement |
|---|---|---|---|
| Arm $(M_0M_1)$ | $+\varphi_0$ | $(-\varphi_0)$ | $= 0$ (around $M_0$) |
| Circle $K_1$ | $+\varphi_1$ | $0$ | $= +\varphi_1$ (around $M_1$) |
| Circle $K_0$ | $0$ | $(-\varphi_0)$ | $= -\varphi_0$ (around $M_0$) |
| System $S_1$ | $+\varphi_0$ | $(-\varphi_0)$ | $= 0$ (around $M_0$) |

That is to say, if the arm $(M_0M_1)$ and the system $S_1$ are stationary and the circle $K_1$ rotates around its centre $M_1$, the tools in the system $S_1$ which are fitted to the circle $K_1$ cut arcs corresponding to the shape of the circle $K_1$. All the tools fitted to the circle $K_1$ cut the same arc. Hence machining is not continuous.

To cut another arc, the tool must be disengaged from the wheel, the latter must be curved through one division in order that the next tooth space may be machined.

The same process as applied to hypocycloids is shown in Fig. 22.

The total movement of the individual members in Fig. 22 is as follows:

| Member | 1st movement | +2nd movement | = Total movement |
|---|---|---|---|
| Arm $(M_0M_1)$ | $+\varphi_0$ | $(-\varphi_0)$ | $= 0$ (around $M_0$) |
| Circle $K_1$ | $-\varphi_1$ | $0$ | $= -\varphi_1$ (around $M_1$) |
| Circle $K_0$ | $0$ | $(-\varphi_0)$ | $= -\varphi_0$ (around $M_0$) |
| System $S_1$ | $+\varphi_0$ | $(-\varphi_0)$ | $= 0$ (around $M_0$) |

The arm $(M_0M_1)$ and system $S_1$ are stationary. The circle $K_1$ rotates through the angle $\varphi_1$ to the left around its center $M_1$ while the circle $K_0$ rotates, also to the left, through the angle $\varphi_0$ around its centre $M_0$.

If the stationary system $S_1$ is imagined to have a circle $K_4$ of the size of the circle $K_0$, then to avoid confusion the circle $K_1$ must be given the reference $K_1'$.

If the peripheral speed $V_1$ of the circle $K_1'$ is assumed to be 1 and the peripheral speed $V_4$ of the circle $K_4$ is assumed to be zero, the speed ratio of these circles is $$\frac{V_4}{V_1'} = \frac{0}{1} = x$$

wherein $x$ is the ratio of the speed $V_4:V_1$.

If, as shown in Fig. 22:

$$r_1' = 2.5 \text{ cm.}$$
$$r_4 = 6.5 \text{ cm.}$$
$$a = r_4 - r_1' = 6.5 - 2.5 = 4$$
$$a = 4 \text{ cm.}$$

then, according to the equation $$r_1 = x \cdot \frac{r_1'}{r_4} (a + r_1)$$

$$r_1 = \frac{r_1' \cdot a}{\frac{r_4}{x} - r_1'}$$

and if $x = 0$, then $$r_1 = \frac{2.5 \cdot 4}{\frac{6.5}{0} - 2.5} = \frac{10}{\infty - 2.5} = \frac{10}{\infty} = 0 \qquad r_1 = 0$$

From $a = r_0 - r_1$ there is obtained:

$$r_0 = a + r_1$$
$$r_0 = 4 + 0 = 4$$

Hence circles rotating at equal speeds represent another extreme case. The circle $K_1$ is $= 0$, that is, the circle $K_1$ has become the point at $M_1$. The circle $K_0$ has a radius $r_0 = 4$ which is equal to the distance $a$ between the axes. There is no rolling of circles which rotate at the same speed but the system $S_1$ is stationary while the tool circle $K_1'$ rotates. This is the dividing method as known nowadays.

In addition to these movements, there is the generating movement which has been described in the preceding section and in section $(b)$ and which need not be described in greater detail here. The generating movement is necessary to generate the tooth shape.

*The novel process for cutting arcuate or substantially arcuate tooth flanks*

*The matching circle as tool circle and the cutting of accurate arcuate flanks.*—The preceding section on the cutting of arcuate teeth by the dividing method, shows that, if a tool circle $K_1$ or $K_1'$ is assumed, it is not possible to cut circular arcs of identical shape and size continuously. The condition: "If a tool and the tooth flank to be produced pass through the cycloidal path simultaneously, a circle must be produced," leads to the thought that every cycloid can be produced in two ways. Referring to Fig. 23, if the circle $K_1$ so rolls on the stationary circle $K_0$ that the points 1, 2, 3 and so on of the circle $K_1$ engage seriatim with the points 1', 2' 3' and so on of the circle $K_0$, the point 6 on the circle $K_1$ passes through the illustrated hypocycloid from 6 to 6'. The arm $(M_0M_1)$ has rotated to the right through the angle $\varphi_{01}$ around its centre $M_0$ and the circle $K_1$ has rotated to the left through the angle $\varphi_1$ around its centre $M_1$.

The point 6 on the circle $K_2$ passes through the same hypocycloid from 6 to 6' if the circle $K_2$ so rolls upon the stationary circle $K_0$ that the points 1, 2, 3 and so on of the circle $K_2$ engage seriatim with the points 1‴, 2‴, 3‴ and so on of the circle $K_0$. The arm $(M_0M_2)$ has then rotated to the left through the angle $\varphi_{02}$ around its centre $M_0$ and the circle $K_2$ has rotated to the right around its centre $M_2$ through the angle $\varphi_2$. Referring to Fig. 23 it will be apparent that where $U_1$, $U_2$ and $U_0$ are the lengths of the respective circumferences of the circles $K_1$, $K_2$ and $K_0$ $$2r_1 + 2r_2 = 2r_0$$

and $$U_1 = 2r_1 \cdot \pi$$
$$U_2 = 2r_2 \cdot \pi$$
$$U_0 = 2r_0 \cdot \pi$$
$$U_0 = U_1 + U_2$$

The circle $K_2$ is referred to as the matching circle of the circle $K_1$. Referring to Fig. 24, the arm ($M_0M_2$) does not rotate about its centre $M_0$, so that the circle $K_2$ can rotate only around its centre $M_2$. If during this operation the circle $K_0$ rotates around its centre $M_0$ at the same peripheral speed $V_2(V_0=V_2)$ as the circle $K_2$ rotates around its centre $M_2$ and if the hypocycloid P—P'' is imagined as being secured to the circle $K_0$, the hypocycloid also performs a rotary movement around the centre $M_0$.

If the semicircle P, 1', 2', 3', 4', 5', 6', of the circle $K_1$ is the tooth flank to be cut in the system $S_1$, this semicircle must also pass through the cycloidal path.

If the circle $K_0$ is stationary, the arc length P, 1', 2' of the semicircle $K_16'$ traced on the system $S_1$ passes through the now stationary hypocycloid secured to the circle $K_0$ from P to $P_2$, provided that the system $S_1$ rotates around its centre $M_0$ to the right through the angle $\varphi_1$. The centre of the semicircle traced on the system $S_1$ is then at $M_1'$.

If the circle $K_0$ to which the hypocycloid PP'' is attached is not stationary but simultaneously rotates to the right through the angle $\varphi_2$ around its centre $M_0$, the hypocycloid will take up the new position P', 2, 2''.

To comply with the condition that the semicircle $P_6'$ to be produced passes through the hypocycloidal path, the system $S_1$ must rotate an additional distance to the right through the angle $\varphi_2$ around its centre.

The total rotation of the system $S_1'$ is given by the angle $\varphi_1+\varphi_2=\varphi_3$. If at the same time the circle $K_2$ rotates to the right through the angle $\varphi_3$ around its centre $M_2$, a tool secured to the circle $K_2$ at the point P will cut the arc P''', 2 in the system $S_1'$.

If a number of tools are disposed on the circle $K_2$ in a predetermined spaced relationship they will not pass through the same cycloid but each tool will pass through a separate cycloid. As a result, the tools do not cut a single arc in the system $S_1'$ but each tool cuts a separate arc of identical shape, the arcs being separated from one another by the distance separating the tools.

Hence circular arcs can be cut continuously by this method.

For the sake of clarity the process will be explained again with reference to Fig. 25.

The arm ($M_0M_2$) is stationary. A tool is secured to the circle $K_2$ at the point $P_4$. If the circle $K_2$ rotates through the angle $-\varphi_1$ to the left around its centre $M_2$, the tool will move from the point $P_4$ along the circle $K_2$ to the point P'.

It is true that the circle $K_0$ to which the hypocycloid $(P_0-P_6)$ is secured rotates at the same peripheral speed $(V_0=V_2)$ around its centre $M_0$ as the circle $K_2$ rotates around its centre $M_2$, since the circles $K_2$ and $K_0$ have rolled through equal arc lengths (arc $P_4P'=$ arc $P_0P'$), but the circle $K_0$ to which the cycloid is secured has rotated around its centre $M_0$ through the angle $-\varphi_2$.

If the tool secured to the circle $K_2$ at the point $P_4$ is to cut the arc $P_4P$ in the system $S_1$, the latter must rotate to the left through the angle $-\varphi_1$ around its centre $M_0$ in order that the tool and the end point P of the tooth flank meet again at the point P'. If:

$r_1$=radius of arc $K_1$ to be generated
$r_2$=radius of tool circle $K_2$ (matching circle of $K_1$)
$r_0$=radius of construction circle $K_0$
$r_0'$=radius of the imaginary circle $K_0'$ in the system $S_1$, of the same size as the construction circle $K_0$
$b_1$=arc $P_4P$ or $P_4'P'$ of the circle $K_1$
$b_2$=arc $P_4P'$ of the circle $K_2$
$b_0$=arc $P_0P'$ of the circle $K_0$
$b_0'$=arc $P'P'$ of the circle $K_0'$ in the system $S_1$ then:
$$b_2=r_2 \cdot \text{arc } \varphi_1$$
$$b_0=r_0 \cdot \text{arc } \varphi_2$$
$$b_0'=r_0 \cdot \text{arc } \varphi_1$$

since $b_2=b_0$ is, therefore $$r_2 \cdot \text{arc } \varphi_1 = r_0 \cdot \text{arc } \varphi_2$$

$$\frac{r_2}{r_0} = \frac{\text{arc } \varphi_2}{\text{arc } \varphi_1}$$

Replacing the arcs by the speeds, we have:

$$V_2 = V_0$$

$$V_2 = \frac{2r_2 \cdot \pi \cdot n_2}{60} = r_2 \cdot \frac{\pi \cdot n_2}{30} = V_2 = r_2 \cdot \omega_2$$

$$V_0 = \frac{2r_0 \cdot \pi \cdot n_0}{60} = r_0 \cdot \frac{\pi \cdot n_0}{30}$$

$$V_0 = r_0 \cdot \omega_0$$

$$r_2 \cdot \omega_2 = r_0 \cdot \omega_0$$

$$\frac{r_2}{r_0} = \frac{\omega_0}{\omega_2}$$

That is to say, the radii of circles of equal peripheral speed are inversely proportional to the angular velocities of such circles. If the tool circle $K_2$ moves to the left around its centre $M_2$ through the angle $-\varphi_1$, the tool secured to the circle $K_2$ at the point $P_4$ passes through the hypocycloid extending from $P_4$ to $P_0$, in relation to the construction circle $K_0$, since the construction circle $K_0$ and the imaginary hypocycloid attached thereto rotate to the left through the angle $-\varphi_2$ around their centre $M_0$ at the same time.

If we now consider not the relationships between circles of equal peripheral speed but the relationships between the tool circle $K_2$ and the circle $K_0'$ in the system $S_1$ then:

$$\frac{b_2}{b_0'} = \frac{r_2 \cdot \text{arc } \varphi_1}{r_0' \cdot \text{arc } \varphi_1}$$

$$\frac{b_2}{b_0'} = \frac{r_2}{r_0'}$$

Replacing the arcs by the speeds we have:

$$V_2 = \frac{2r_2 \cdot \pi \cdot n_2}{60} = r_2 \cdot \frac{\pi \cdot n_2}{30}$$

$$V_2 = r_2 \cdot \omega_2$$

$$V_0' = \frac{2r_0 \cdot \pi \cdot n_3}{60} = r_0' \cdot \frac{\pi \cdot n_3}{60}$$

$$V_0' = r_0' \omega_3$$

where $n_3$=speed of system $S_1$, and $\omega_3$=angular velocity of system $S_1$.
Therefore:

$$\frac{V_2}{V_0'} = \frac{r_2 \cdot \omega_2}{r_0' \cdot \omega_3}$$

Since the angles through which the circle $K_2$ and system $S_1$ rotate are equal, the speeds are equal, so that $n_2=n_3$.
Therefore:

$$\frac{\pi \cdot n_2}{30} = \frac{\pi \cdot n_3}{30}$$

$$\omega_2 = \omega_3$$

and $$\frac{V_2}{V_0'} = \frac{r_2}{r_0'}$$

Referring to Fig. 25, if circles $K_1$ are cut in the system $S_1$, the angular velocities of the circle $K_2$ and system $S_1$ are equal and the peripheral velocities of the circles $K_2$ and $K_0'$ are directly proportional to their radii.

The equations:

$$\frac{V_4}{V_1'} = x = \frac{r_4}{r_1'} \cdot \frac{r_1}{r_0}$$

and $$r_1 = \frac{r_1' \cdot a}{\frac{r_4}{x} - r_1'}$$

set up for elongated cycloids are now used; they apply to the production of cycloidally curved teeth and take no account of the tool and the tooth flanks to be formed passing through the cycloidal path simultaneously. To correlate the references with the foregoing and with Fig. 25:

$V_4 = V_0'$ = peripheral velocity of the circle $K_0'$ of the system $S_1$
$V_1' = V_2'$ = peripheral velocity of the circle $K_2'$ (in Fig. 25 = $K_2$)
$r_4 = r_0'$ = radius of circle $K_0'$ in the system $S_1$
$r_1' = r_2'$ = radius of circle $K_2'$
$r_1 = r_2$ = radius of circle $K_2$ ⎱ Circles of equal
$r_0 = r_0$ = radius of circle $K_0$ ⎰ peripheral velocity.

$r_1$ = radius of circles $K_1$ to be produced and the equations then become:

$$\frac{V_0'}{V_2'} = x = \frac{r_0'}{r_2'} \cdot \frac{r_2}{r_0}$$

and $$r_2 = \frac{r_2' \cdot a}{\frac{r_0'}{x} - r_2'}$$

If the circles of Fig. 25 are given the following dimensions: $r_0' = 6.5$ cm.; $r_2' = 4$ cm.; $a = 2.5$ cm., then, when circles are generated, we have, as previously shown:

$$\frac{V_0'}{V_2'} = x = \frac{r_0'}{r_2'} = \frac{6.5}{4}$$

$$r_2 = \frac{r_2' \cdot a}{\frac{r_0'}{x} - r_2'} = \frac{4 \cdot 2.5}{\frac{6.5}{6.5/4} - 4} = \frac{10}{4-4} = \frac{10}{0} = \infty$$

$$r_2 = \infty \; ; \; a = r_0 - r_2$$

$$r_0 = a + r_2 = 2.5 + \infty \; ; \; r_0 = \infty$$

$$\frac{V_0'}{V_2'} = x = \frac{r_0'}{r_2'} \cdot \frac{r_2}{r_0}$$

$$\frac{V_0'}{V_2'} = \frac{6.5}{4} = \frac{6.5}{4} \cdot \frac{\infty}{\infty}$$

Since $$\frac{\infty}{\infty}$$

can have any value, that is, $$\frac{\infty}{\infty} \text{ can} = 1$$

in this case, therefore:

$$\frac{V_0'}{V_2'} = \frac{6.5}{4}$$

That is to say, if the circle $K_1$ produced by the tool circle $K_2'$ is regarded as the special case of a cycloid, the radii of the circles $K_0$ and $K_2$, which run at the same peripheral velocity, are infinitely large. Hence circular arcs can be produced by continuous hobbing in this way.

Referring to Fig. 26, a tool can again be seen in engagement with the gearwheels to be produced.

Generation of profile

The foregoing comments on the continuous hobbing of hypoid teeth deal merely with the production of flank lines as they occur along the tooth width. In this case too a generating motion must be additionally initiated in order that the tooth profile, for instance, an octoid, may be formed and the tooth spaces may be machined to the full tooth depth. The cut is effected spirally over the tooth flank.

At the point $P_1$, position 1, Fig. 27, the tool begins to cut the outermost top edge of the inner profile; in the position $P_a$, position 2, the tool cuts the outer top edge of the outer profile, position 3 is the end position for hobbing the inner profile, and in position $P_a'$, position 4, the generation terminates. The total angle of generation is $\varphi\omega$ and is indicated by positions 1 and 4.

As in Fig. 20, the additional generation is initiated by the cradle and the tool centre travels from $M_2$ to $M_2''$. Here again the speed of the blank should be altered by the rate of generation.

Face gear, the number of teeth thereon and the number of cutting tools

As a rule, the tool is applied in the plane of the face gear in the production of bevel wheels, so that the cutting edges of the tools bound the tooth flanks of a face gear. Therefore, the tools used for the wheel and matching wheel should coincide in the plane of the face gear, as shown in Fig. 4.

If one of the wheels is to be produced, for instance, as shown in Fig. 28, the transmission ratio between the wheel to be produced and the face gear is an important factor. The pitch cone of the wheel to be produced is developed on the face gear. The number of teeth of the face gear is determined by the following formula:

$$Z_D = \frac{Z_1}{\sin \delta_1} = \frac{Z_2}{\sin \delta_2}$$

The fraction, that is, the number of teeth divided by the pitch cone angle, is not usually an integer but a decimal number. Only exceptionally is the number of the teeth on the face gear an integer, for instance, if $\delta_1 = 30°$ then $\sin 30° = 0.5$, and if $Z_1 = 20$, then $$Z_D = \frac{20}{0.5} = 40$$

Since the tool and wheel rotate at the same angular velocity during the continuous cutting of arcs, the tool will cut as many teeth in the blank as the tool has cutters. If a cutter is secured to the circle $K_2$ at the point P in Fig. 29, such cutter will cut the hatched arc $K_1$ in the wheel blank, that is, the system $S_1$, if the circle $K_2$ rotates around its centre $M_2$ both through the angle $\varphi_2 = 180°$ to the right.

If further cutters are attached to the circle $K_2$ at the points 1, 2, 3 and so on, each such cutter cuts another arc of the same shape in the system $S_1$, such arcs being separated from one another by the same amount. If, as shown in Fig. 29, a number of cutters, for instance, twelve, are secured to the tool (circle $K_2$), 12 teeth will be cut in the system $S_1$. If the tool has 40 cutters, 40 teeth will be cut in the system $S_1$.

Since the cutter delineates the flank of the face gear tooth, because it lies in the plane of the face gear, the number of face gear teeth must be taken into account in the size and design of the tool.

However, the number of teeth on the face gear is very seldom an integer and is usually a decimal number.

For instance, if the number of teeth on the face gear $Z_D = 50.8$, the tool should have 50.8 cutters to cut accurate arcs, that is, after the fiftieth cutter, the next cutter should be fitted at a distance not of one complete division but of 0.8 of a division. This is impossible, since the teeth can only be spaced one complete division apart from one another.

Hence accurate arcs can be cut in the plane of the face gear only if the number of teeth thereon represents an integer. This also applies to the production of conical teeth of the kind shown in Fig. 5. In the latter case it is true that the planes of the cradles and face gear are parallel with one another, but the tools are pivoted out of this plane by the root angle so that theoretical errors occur in the tooth profile because the tools do not coincide in the face gear plane.

Pivoting out of the face gear plane

For the cutting of teeth on bevel wheels it is not absolutely necessary for the tool to be placed in the face gear plane, and other planes can be used. Referring to Fig. 30, for instance, if the cradle center coincide with the wheel centre while the teeth are being cut on the large wheel, the tool is pivoted inwards through the angle $\delta_1$ relatively to the cradle centre. On the other hand, when teeth are to be cut on the small wheel, the cradle centre is at 90° to the wheel centre and the tool is pivoted outwards through the angle $\delta_1$ relatively to the cradle centre. The tools coincide in the pitch cone plane and an accurate theoretical tooth system is produced. Using this setting, the large wheel is given a straight profile as is normally produced in the face gear plane, but the pinion profile is given an increased amount of curvature.

Other planes in which the tools producing the wheel and the matching wheel coincide can be assumed. For instance, if the wheels shown in Fig. 30 have the following dimensions: small wheel—$Z_1=12$, $\delta_1=25.6410°$, $\sin \delta_1=0.4327310$; large wheel—$Z_2=25$, $\delta_2=64.3590°$, $\sin \delta_2=0.90152231$; angle between axes=90°; then the number of teeth on the face gear is $$Z_p = \frac{Z_1}{\sin \delta_1} = \frac{Z_2}{\sin \delta_2} = 27.73$$

$$Z_p = 27.73$$

If we now assume the generating plane of a wheel having 27 or 28 teeth in which the tools are to coincide, this plane will lie quite near the face gear plane.

For instance, if we choose the generating plane of a 27-tooth wheel, only a wheel having 27 teeth would have teeth with a straight profile. Wheels with 12 and 25 teeth would have curved tooth profiles (other than octoidal) but in theory mesh correctly.

Fig. 31 illustrates the setting of the cradles and tools when the teeth are being cut on these wheels. The advantage of the settings shown in Figs. 30 and 31 is that they do not depend upon the number of face gear teeth and the generating conditions are determined only in accordance with integral numbers of teeth. As a result, the lengthwise lines of the tooth flanks are always exact arcs. These tooth systems can always be ground on the flanks.

The disadvantage of this tooth system is that the tool must be pivoted out of the face gear plane. As a result, there are difficulties in mounting and relative movement between the tool and the hob and this makes it difficult to set the tool to the same values when making a plurality of equal wheels.

The cutting of arc-like tooth flanks

As mentioned in the last section, difficulties arise in mounting the transmission between the tool and the hob if the tooth system plane in which the tools coincide is a plane other than the face gear plane.

On the other hand, if the face gear plane is used as the tooth system plane, the machine can be constructed in a very simple manner. The tool and cradle can be repeatedly set to the same values, so that the manufacture of interchangeable gearwheels becomes possible.

If the face gear plane is used, however, accurate arcs will be cut only if the number of teeth of the face gear is a whole number, a condition not usually found.

If the tool is provided with cutters to a number equal to the nearest integer to the number of face gear teeth, the tool circle is increased or reduced, depending upon whether the integer chosen is above or below the theoretical value. The peripheral velocities remain identical but the angular velocities and the angular velocities between the tool and wheel cease to be identical, as they should be to cut accurate arcs. This slight alteration in angular velocities results in a cyclic curve being produced which is theoretically correct and is substantially identical with the circular arc, so that an accurate circular arc can be ground after heat treatment.

The production of this arc-like tooth will now be described.

Figure 32:
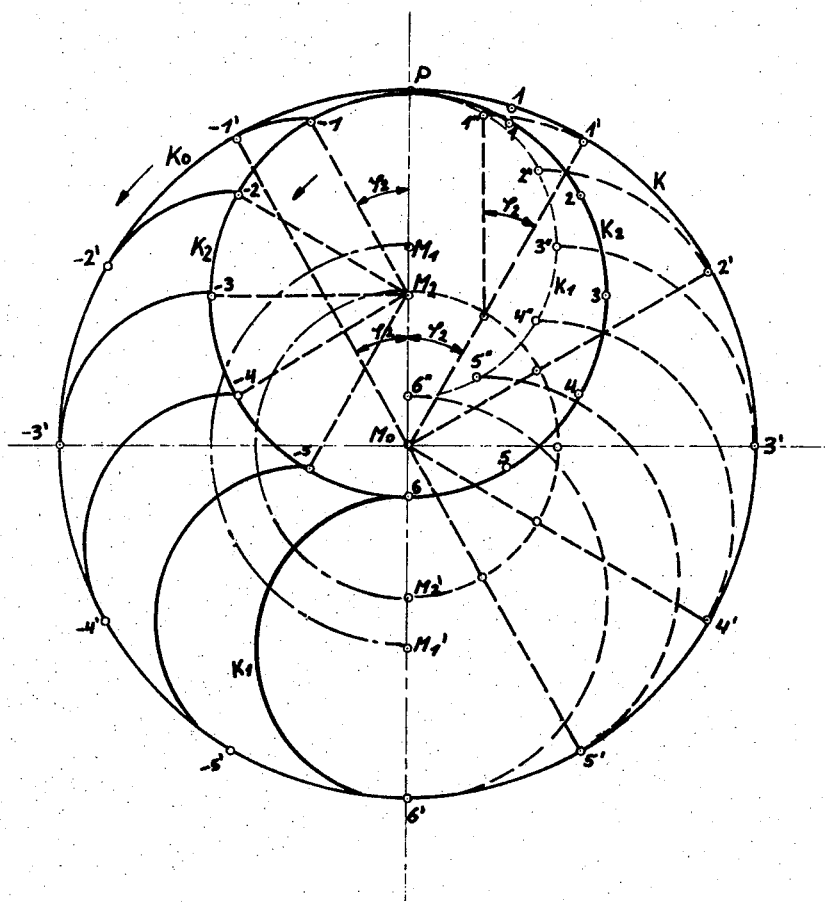
Figure 33:
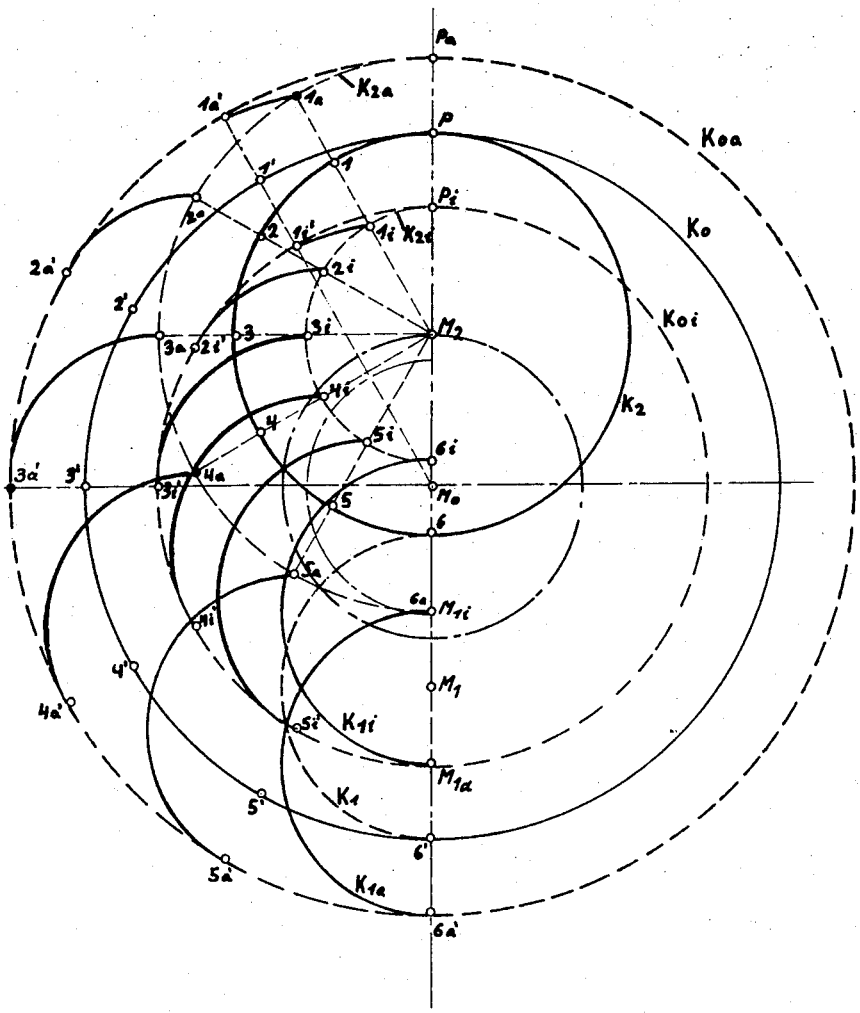

Fig. 32 is another illustration of the generation of arcs. In the right-hand side of Fig. 32, the circle $K_2$ rolls on the circle $K$ and the point $P$ of the circle $K_2$ describes the arc $K_1$. It is assumed in the left-hand side of Fig. 32 that the circles $K_2$ and $K_0$ rotate at the same angular speed. The point $P$ of the circle $K_2$ therefore describes the circle $K_1$ in relation to the circle $K_0$.

Points such as $P_i$ or $P_a$ (Fig. 33) inside or outside the circle $K_2$ describe, in relation to the circles $K_{0i}$ on $K_{0a}$, arcs such as $K_{1i}$ or $K_{1a}$. These circles $K_{1i}$ or $K_{1a}$ therefore have a different position in relation to their centre $M_0$ from the circle $K_1$.

Figure 34:
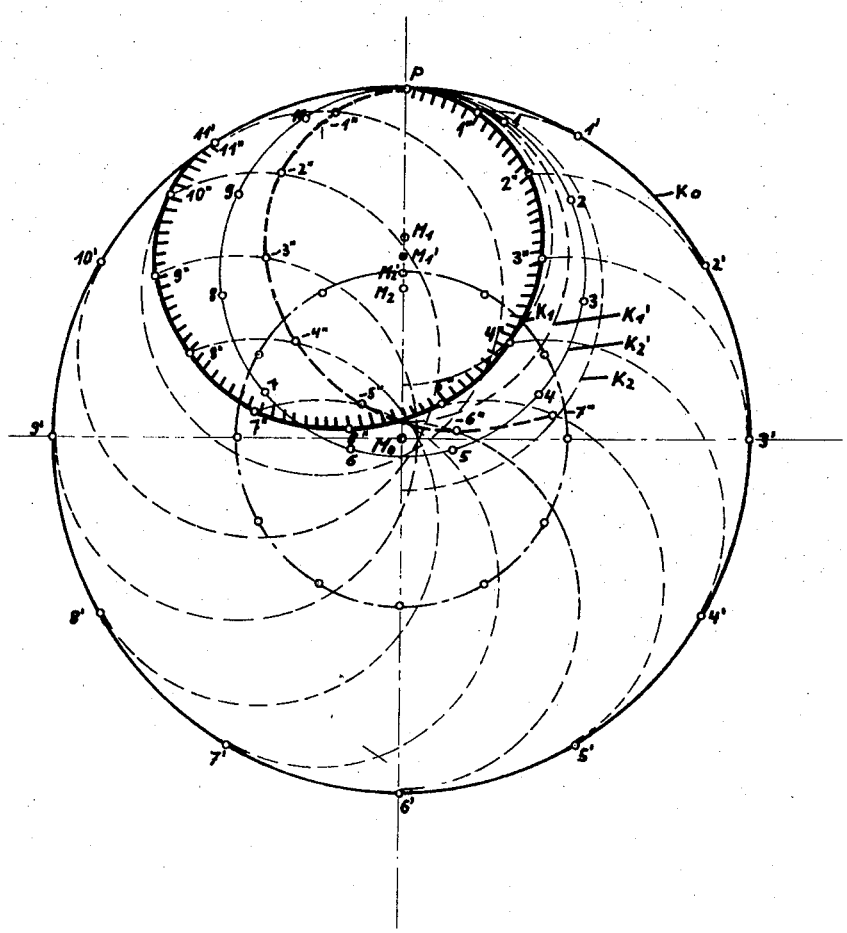

Referring to Fig. 34, the circle $K_0$ is divided into 12 sections which represent the number of face gear teeth, although this number is usually a decimal number and, for reasons concerned with the drawings, has been assumed to be an integer. Associated with the circle $K_0$ is the tooth circle $K_2$ on which 12 divisions should also be marked off. The circle $K_2$ would produce the circles $K_1$ in a system $S_1$.

However, only the tool circle $K_2'$ is chosen which is so designed that 11 divisions of the circle $K_2$ can be marked off on its periphery. The circle $K_2'$ rotates at the same peripheral velocity as the circle $K_2$. Hence the angular velocities of the circles $K_2'$ and $K_0$ are no longer identical and the point $P$ of the circle $K_2'$ describes the cycloid $P$, $1''$, $2''$, $3''$ and so on which has only small deviations from the circle $K_1$ at the points $P$ to $4''$.

In actual fact the deviations are much smaller, for the difference between the peripheries of the circles $K_2$ and $K_2'$ is equal to one division in Fig. 34, whereas at the most it can be half one division in practice.

Figure 35:
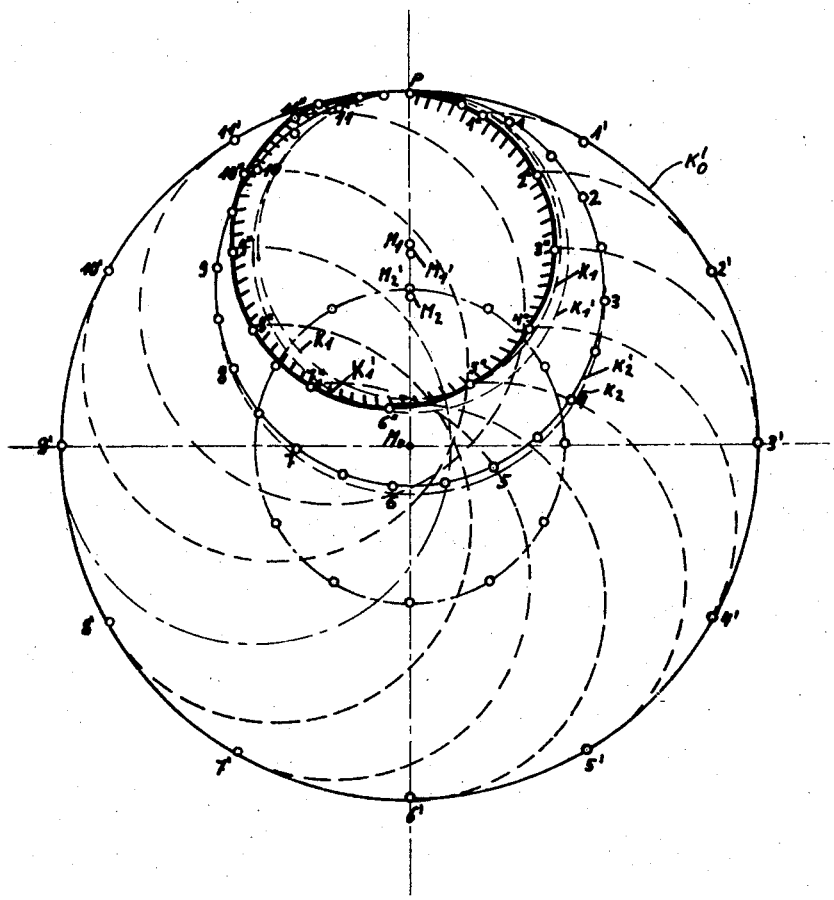

Referring to Fig. 35, the difference between the peripheries of the circles $K_2$ and $K_2'$ is only half of one division and the cycloid approximates even more closely to the circular arc $K_1$.

For instance, if the cycloidal section $2''$ to $4''$ is used as the tooth curve, the tooth systems on the wheel and matching wheel are theoretically accurate. If the system is to be ground after heat treatment, a substitute circle can be found for this purpose and the tooth system then becomes an exact hypoid tooth system.

A substitute circle can be determined analytically.

It is difficult to portray the conditions well by means of drawings, since in the production of arcs the radii of the circles $K_0$ and $K_2$ of equal peripheral velocity become infinitely large and, in the production of approximated arcs, the radii of the circles $K_0$ and $K_2$ are very large as compared with the radii of the circles $K_0'$ and $K_2'$. The analysis will therefore be given with reference to circles which can be correctly illustrated by means of drawings.

Figure 36:
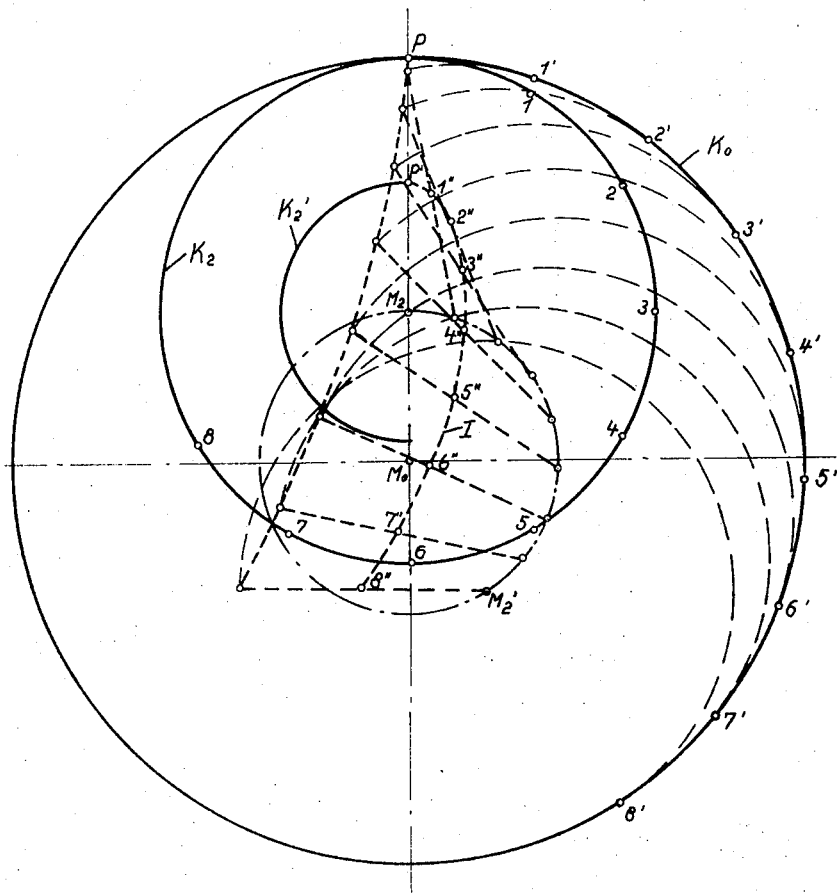

Referring to Fig. 36, if the circle $K_2$ rolls on the stationary circle $K_0$, the cycloid I is described by a point $P'$ lying on the circle $K_2'$ and attached to the circle $K_2$.

Figure 37:
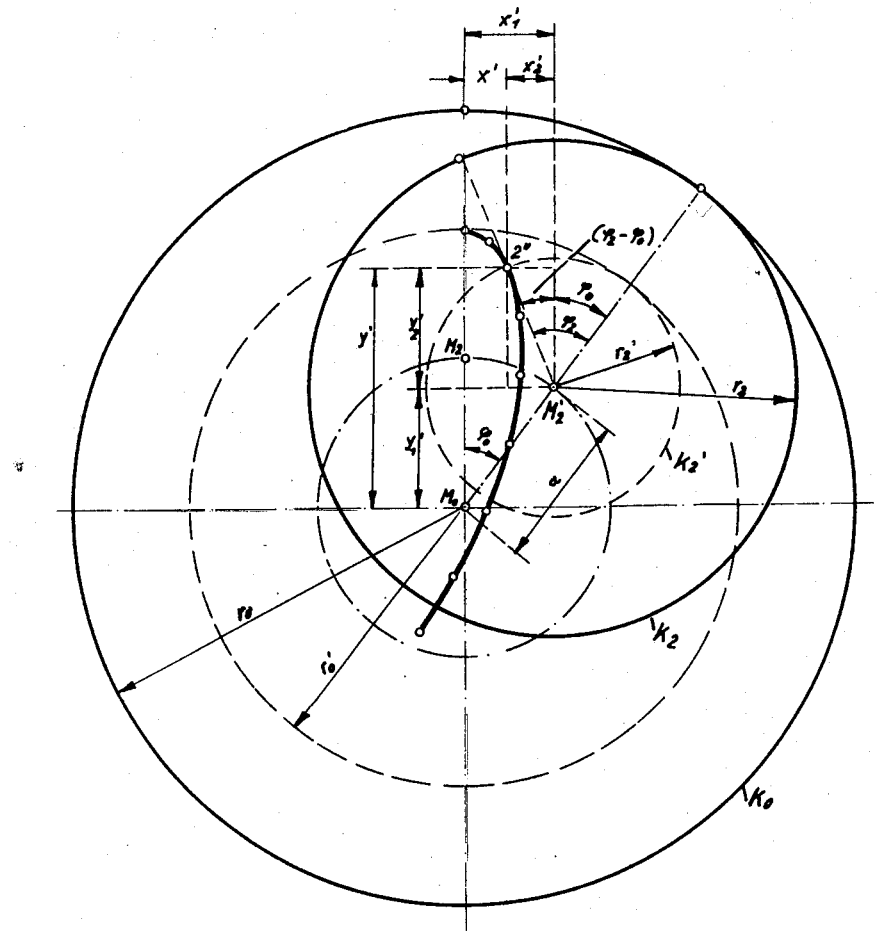

The individual points $1''$, $2''$, $3''$ and so on of the cycloid I can be calculated as follows with reference to Fig. 37. The point of intersection of the system of co-ordinates is placed at the centre $M_0$ of the circle $K_0$. Accordingly:

$$\sin \varphi_0 = \frac{x_1'}{a}$$

$$x_1' = a \sin \varphi_0$$

$$\sin (\varphi_2 - \varphi_0) = \frac{x_2'}{r_2'}$$

$$x_2' = r_2' \cdot \sin (\varphi_2 - \varphi_0)$$

$$x' = x_1' - x_2'$$

$$x = a \cdot \sin \varphi_0 - r_2' \cdot \sin (\varphi_2 - \varphi_0)$$

$$\cos \varphi_0 = \frac{Y_1'}{a}$$

$$Y_1' = a \cdot \cos \varphi_0$$

$$\cos (\varphi_2 - \varphi_0) = \frac{Y_2'}{r_2'}$$

$$Y_2' = r_2' \cdot \cos (\varphi_2 - \varphi_0)$$

$$Y' = Y_1' + Y_2'$$

$$Y' = a \cdot \cos \varphi_0 + r_2' \cdot \cos (\varphi_2 - \varphi_0)$$

where $a = r_0' - r_2'$, and $a = r_0 - r_2$.

The centres of curvature of the individual points on the cycloid can be determined in the same way as the said individual points.

Figure 38:
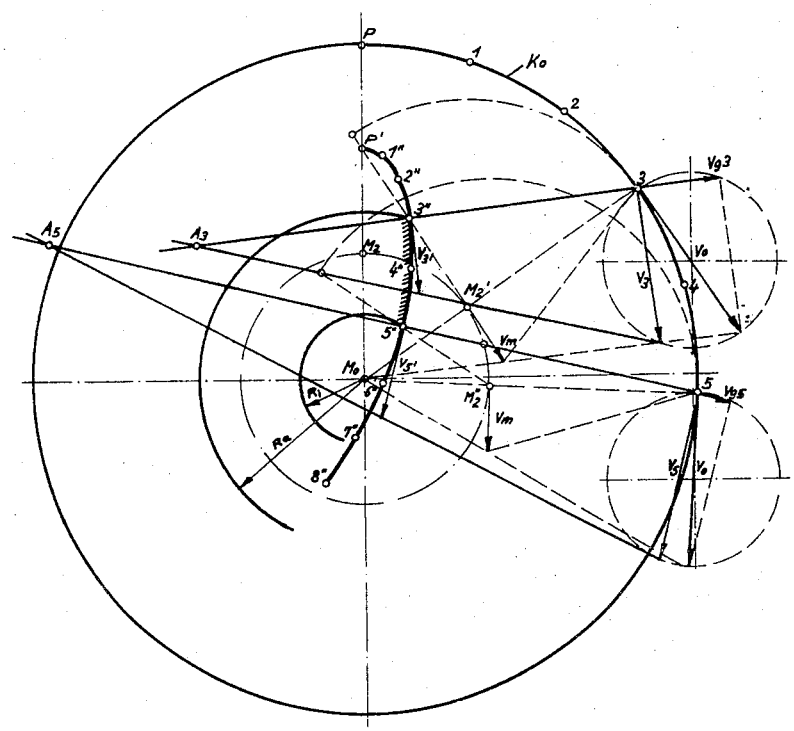

Fig. 38 shows how the centres of curvature $A_3$ and $A_5$ for the cycloid points $3''$ and $5''$ can be found graphically. The analytical calculation is known and will not be stated here. The centres of curvature $A_3$ and $A_5$ are far apart, but it should be noted that the cycloid shown in Fig. 38 is very far removed from being a circle.

The following example will be taken:

$Z_p = 24.5$ = number of face gear teeth
$d_0 = 14$ cm. = diameter of circle $K_0'$
$d_2 = 8$ cm. = diameter of circle $K_2'$ (tool circle)

If the circles $K_0'$ and $K_2'$ have identical angular velocities, then $\omega_0' = \omega_2'$ and the ratio of the peripheral velocities of these circles is:

$$\frac{V_0'}{V_2'} = \frac{r_0'}{r_2} = x = \frac{7}{4} = 1.75$$

in this case the circle $K_1'$ is generated by the cycle $K_2'$ in the system $S_1$. The radii of the circles of equal peripheral velocity are:

$$r_0 = \infty$$
$$r_2 = \infty$$

The tool should have 24.5 divisions. Since this is impossible, 24 divisions are chosen.

The new tool circle is calculated as follows:

$$U_2' = d_2' \cdot \pi = Z_p \cdot t_2'$$
$$U_2'' = d_2'' \cdot \pi = Z_2 \cdot t_2'$$

where $U_2'$ = periphery of tool circle $K_2'$ with 24.5 divisions
$t_2'$ = tool division
$U_2''$ = pheriphery of new tool circle $K_2''$ with 24 divisions
$Z_2$ = number of cutters on tool circle $K_2''$ $$t_2' = \frac{d_2'}{Z_p} = \frac{8}{24.5} = 0.32653061$$

$$d_2'' = t_2' \cdot Z_2 = 0.32653061 \cdot 24$$

$$d_2'' = 7.83673464$$

$$r_2'' = 3.91836732$$

The peripheral velocity ratio $$\frac{V_0'}{V_2'} = 1.75$$

is not altered, that is, the circles $K_0'$ and $K_2''$ run at this ratio. However, this means that the angular velocities of the circles $K_0'$ and $K_2'$ are no longer equal to one another, nor are the radii of the circles $K_0$ and $K_2$ of equal speed any longer infinitely great.

The speed ratio of the circle $K_0'$ and $K_2''$ is found by calculation to be:

$$\frac{V_0'}{V_2''} = x = \frac{r_0'}{r_2''} \cdot \frac{r_2}{r_0} = \frac{7}{3.91836} \cdot \frac{r_2}{r_0}$$

The radii of the circles $K_0$ and $K_2$ of equal peripheral velocity become:

$$r_2 = \frac{r_2'' \cdot a'}{r_0' - r_2''}$$

$$r_2'' = 3.91836$$

$$r_0' = 7$$

$$x = 1.75$$

$$a' = r_0' - r_2'' = 7.0 - 3.91836$$

$$a' = 3.08164$$

If:

$$r_2 = \frac{3.91836 \cdot 3.08164}{\frac{7}{1.75} - 3.91836} = \frac{12.0749749}{4 - 3.91836}$$

$$r_2 = \frac{12.0749749}{0.08164}$$

$$r_2 = 147.9051 \text{ cm}$$

$$a = r_0 - r_2$$

$$r_0 = a + r_2 = 3.08164 + 147.9051$$

$$r_0 = 150.98674 \text{ cm}$$

therefore:

$$\frac{V_0'}{V_2''} = x = \frac{r_0'}{r_2''} \cdot \frac{r_2}{r_0} = \frac{7}{3.91836} \cdot \frac{147.9051}{150.98674}$$

$$\frac{V_0'}{V_2''} = x = 1.75$$

Fig. 39 illustrates the curve for the example taken, but the drawing is merely an approximation since drawings will not show the minor differences between the curve and the circle. That is why the calculation has been performed.

If a wheel blank bounded by the outer radius $R_a$ and inner radius $R_i$ is chosen, the length of arc $4''$ to $7''$ is used to form the tooth. The values of $x'$ and $y$ are ascertained for the points of the curve $4''$, $5''$, $6''$, $7''$ and from this the radii $\rho'$ are determined.

In Fig. 40:

$\rho' = 29.664$ mm. for point $4''$
$\rho' = 29.574$ mm. for point $5''$
$\rho' = 29.546$ mm. for point $6''$
$\rho' = 29.614$ mm. for point $7''$ If a mean value $\rho = 29.605$ mm. is taken for $\rho'$ on the basis of these calculated values, the deviations at individual points are as follows:

Point $4''$ difference = +0.059 mm.
Point $5''$ difference = −0.03 mm.
Point $6''$ difference = −0.059 mm.
Point $7''$ difference = +0.010 mm.

This difference decreases further if from the radii $\rho'$ the exact centre of curvature as shown in Fig. 38 is obtained and not just the mean value.

Since the grinding allowance is 0.12 to 0.15 mm. per flank, the arc-like curve can be converted into an exact arc during grinding.

In this case the tools depend upon the number of face gear teeth, but where wheels are to be mass-produced it is advisable to obtain special tools since working times are considerably reduced.

*Generating motion during the cutting of arc-like tooth flanks*

The foregoing has dealt with the cutting of the lengthwise lines of the teeth, but to generate the tooth profile (octoid) the top of the tool must perform an additional motion in order that the centre $M_2$ of the tool can move around the centre $M_0$ of the wheel, as shown in Fig. 27. The operation is clearly shown in Fig. 27 and will not be described again here. Wheel speed should be altered by an amount corresponding to the rate of generation.

*Working time in the cutting of arcuate or arc-like tooth flanks*

As already stated, the working time can be considerably reduced by this method.

For instance, to cut a wheel having 50 teeth and a real module 5, with 50.8 teeth on the face gear, a tool with 51 cutters will be used. If the face milling cutter is about 200 mm. in diameter, it must rotate at about 50 r.p.m. at a cutting rate of 30 mm./min. If the down feed from tooth to tooth is 0.01 mm., which is relatively speaking a very small value, the depth of penetration of the cutter increases by 0.5 mm. at each rotation of the wheel. If the tooth depth of module 5 is about 11 mm., then 11/0.5=22 rotations of the wheel which are required for the cutter to cut the tooth to the full depth. Also, the cutter has performed about 22 rotations. Since the cutter rotates at a speed of about 50 r.p.m., the time required to cut the teeth is about 22/50=0.44 minute=27 seconds approximately.

Allowing twice as much time for generation, roughing and finishing can be performed in 1.5 to 2 minutes.

*The production of arc-like tooth flanks in small quantities, using a face mill with any desired number of teeth.*

Where gearwheels are to be produced in small numbers, it is usually not worthwhile to obtain a special tool and in such cases recourse is had to any face milling cutter which may be available.

For instance, referring to Fig. 41, the circle $K_2'$ is the tool circle which would produce circles in the system $K_0'$ but a tool of the size of the circle $K_2''$ is used. If the speed ratio of the circles $K_0':K_2'$ is retained in the case of the circles $K_0':K_2''$, the cycloid curve illustrated is produced, and that part of the cycloid curve between the points $P_a$ and $P_1$ will be used as the tooth curve. By calculating the centres of curvature, the centre $M_1''$ of the substitute circle illustrated can be determined.

In practice, however, the speed ratio will be based not on the circles $K_0':K_2''$, for this speed ratio was obtained for the sake of simplicity, but on the circles $K_m:K_2''$, in order that the substitute circles may approximate as closely as possible to the required circle.

The generating motion must be initiated additionally in order that the tooth profile (octoid) may be produced.

So far only gears with co-aixal axes have been dealt with, but the same process can be used for producing gears with offset axes. The gears are displaced from the centre of the cradle while the tooth system is being cut.

*The cutting of spherical tooth flanks*

Spherical teeth, which because of heat-treatment deformation are preferred to avoid overloading the edges of the teeth, can also be produced by this method.

Referring to Fig. 42, the tool I is so fitted that both its cutting edges lie on the circle $K_2$, the cutting edges producing matching circles of radius $r_1$. That cutting edge of the tool II which machines the concave flank is located on a smaller circle $K_2'$ of radius $r_2'$. These cutting edges therefore produce a matching circle $K_1'$ of radius $r_1'$. The cutting edges producing the convex flank is disposed on a larger circle of radius $r_2''$ and therefore generates a smaller matching circle $K_2''$ of radius $r_2''$.

A spherical flank-bearing relationship is produced for the reason that, when the wheel is associated with the matching wheel, one concave and one convex flank of relatively large and relatively small radius engage with one another. The sphericity can be arbitrarily predetermined so that no testing is necessary.

*The machine for continuously cutting wheels having arcuate teeth and arc-like teeth*

The production times made possible by the novel method are so short that all the secondary times, such as the time required to clamp the tools, clamp the gearwheels and so on must be reduced to a minimum otherwise these secondary times are greater than the time required to cut the tooth system.

The tooth head should therefore be clamped by means of a quick-action gripping means. The tool needs no straightening because it is parallel with the plane of the face gear (Fig. 4) and because no complicated bearing and transmission elements are necessary. The face milling cutter, which is mounted in guide-ways in the tool head, merely needs to be moved towards the cradle centre in one direction in accordance with a calculated value.

The dividing head, which has to be pivoted only by the pitch cone in relation to the plane of the face gear, must be adapted to receive a number of wheels.

Since the machine operates continuously, only the simplest movements are required.

*Comparison of the known and novel method for cutting cyclic curves with a face milling cutter*

The known methods.

For the production of cycloidally curved hypoid teeth, elongated cycloids are usually used because they have a greater curvature than normal cycloids and are therefore better suited to tooth formation.

Referring to Fig. 43, for instance, it can be seen how a wheel having teeth curved in accordance with elongated epicycloids is cut. The cutter teeth or rows of cutter teeth are so disposed that their concave side faces the centre $M_2'$ of the face milling cutter.

The gear teeth can also be curved pericycloidally or hypocycloidally. We shall start the hypocycloids for the purposes of comparison with the method according to the invention.

Referring to Fig. 44, the circle $K_2'$ is the tool circle. $K_0'$ (system $S_1$) represents the blank. The tool circle $K_2'$ is again shown at the top for a better understanding of the arrangement of the cutters. Considering the left-hand side of the cutter, it is apparent that the cutter teeth are so fitted that their concave sides face the centre $M_2'$ and the tool rotates in this case to the right at a constant angular velocity $\omega_2$.

If the blank $K_0'$ also rotates to the right and if the peripheral velocity $V_0'$ of the circle $K_0'$ is equal to the peripheral velocity $V_2'$ of the circle $K_2'$, normal cycloids will be cut in the blank. Hence $V_0'=V_2'$, so that the angular velocities are inversely proportional to the radii of the circles.

Therefore:

$$\frac{r_0'}{r_2'}=\frac{\omega_2}{\omega_0}$$

and the speed ratio between the circles $K_0'$ and $K_2'$ is $$\frac{V_0'}{V_2'}=1=x$$

If the general equation:

$$\frac{V_0'}{V_2'}=x=\frac{r_0'}{r_2'}\cdot\frac{r_2}{r_0}$$

is used for the speed ratio, where $r_1$ and $r_0$ denote the radii of circles of equal peripheral velocity, these radii can be calculated if the relationship of the mean distance of these circles $a=r_0'-r_2'=r_0-r_2$ is considered.

Then:

$$r_2=\frac{r_2'\cdot a}{\dfrac{r_0'}{x}-r_2'}$$

Taking the relationships of Fig. 44 as a basis, then:

$r_0'=6.5$ cm., $r_2'=2.5$ cm., $a=4$ cm.

and if $x=1$ then:

$$r_2=\frac{2.5 \cdot 4}{\frac{6.5}{1}-2.5}=\frac{10}{4}=2.5$$

$r_2=2.5$ $r_0=a+r_1=4+2.5$ $r_0=6.5$ cm.

That is to say, when $x=1$, the circles $K_0$ and $K_2$ of equal speed are as big as the circles $K_0'$ and $K_2'$.

Different values of $x$ will be taken for the conditions illustrated in Fig. 44. If $$x=\frac{1}{2}$$

then $$\frac{V_0'}{V_2'}=\frac{1}{2}$$

and the radii of the circles of equal speed are:

$r_2=0.952376$ cm.

$r_0=4.952376$ cm.

The elongated hypocycloid II is produced. If $x=0$, then:

$$\frac{V_0'}{V_2'}=0$$

$r_2=0$ cm.

$r_0=4$ cm.

The circle III is produced. Since $r_2=0$, there is no generation and so this circle can be cut only by the dividing method and not by the continuous method.

If $$x=\frac{1}{2}$$

then $$\frac{V_0'}{V_2'}=-\frac{1}{2}$$

that is, the tool turns to the right as formerly but the wheel turns to the left.

$r_2=-0.64516$
$r_0=\phantom{-}3.35484$

Since $r_2$ is a negative quantity, the radius should be marked off downwards from $M_2'$ and the circles of equal speed now roll one upon another and not one into another. Hence the curve IV which is produced is an elongated epicycloid. If $x=1$, then:

$$\frac{V_0'}{V_2'}=-1$$

$r_2=1.1111$
$r_0=2.8889$

The elongated epicycloid V is produced. During all these changes the tools remain in the position in which they are shown in the top left-hand side. Wheels with a right-hand thread are cut.

If the tools are arranged as shown at the top right-hand side of Fig. 44, the directions of rotation are reversed and wheels with a left-hand thread are produced. However, the tools have their concave sides facing the centre $M_2'$. The curves shown here are produced by the known methods wherein the speed ratio.

$$\frac{V_0'}{V_2'}\lessgtr 1$$

*The method according to the invention*

In the method according to the invention, the speed ratio is $$\frac{V_0'}{V_2'}>1$$

Hence, according to Fig. 44, the following conditions are obtained. If $x=+1.5$ $$\frac{V_0'}{V_2'}=1.5$$

$r_2=5.4545$ $r_0=9.4545$

The foreshortened hypocycloid VI is produced. If $x=2$, then $$\frac{V_0'}{V_2'}=2$$

$r_2=13.3333$ $r_0=17.3333$

The foreshortened hypocycloid VII is produced. If $$x=2.6=\frac{r_0'}{r_2'}$$

then $$\frac{V_0'}{V_2'}=\frac{r_0'}{r_2'}=2.6$$

$r_0'=\infty$ $r_2'=\infty$

The circles of equal speed are infinitely large. The tool and the wheel rotate at the same angular velocity ($\Omega_0=\Omega_2$). The circle $K_1$ (VIII) is produced and by the continuous method.

If $x=4$, then:

$$\frac{V_0'}{V_2'}=4$$

$r_2=-11.4285$ $r_0=-7.4285$

Since the two radii are negative quantities, the foreshortened pericycloid IX is produced. However, all the curves VI and IX of the novel method (Fig. 44) can be cut only if the tools are so arranged on the face milling cutter that the convex side of the cutter tooth faces the centre, as shown by the lower picture forming part of Fig. 44.

The underlaying idea of the invention is based on this arrangement of the cutter teeth and upon the speed ratio $$\frac{V_0'}{V_2'}>1$$

(Fig. 44). It should be particularly noted that the formula just given refers only to Fig. 44 and that the value alters if other assumptions are taken. The assumption on which Fig. 44 is based in that when $V_0'=V_2'$, the circle $K_2'$ rolls into $K_0'$. The formula alters if, with $V_0'=V_2'$, the circle $K_2'$ rolls on the circle $K_0'$. However, nothing is altered so far as the tool is concerned and the difference from the known method remains.

*Field of application of the invention*

The bevel wheels with arcuate or arc-like teeth can be used wherever wheels with hypoid teeth are fitted today. They can be used with advantage in all branches of mechanical engineering and more particularly for the back axle bevel wheels of motor vehicles.

Technical advance on known methods

The technical advance provided by the invention can be summed up as follows:

(1) Extreme reduction in the time to cut teeth on the wheels.

(2) The wheels are produced by continuous cutting on the basis of a theoretical principle, so that very high accuracy is ensured.

(3) The machine is simple in construction, so that it can always be returned to the same setting, thus ensuring that the gearwheels are completely interchangeable.

(4) Heat treated wheels can be ground, so that very high accuracy, very quiet working and complete interchangeability are ensured.

The total time required for cutting teeth and grinding is less than the time now required to cut teeth and lap them. Lapped wheels are not interchangeable.

I claim:

1. A method of continuously cutting teeth in a workpiece to produce a gear wheel having teeth which are arcuate in their length direction which method comprises disposing the cutting edges of a tool on a circle representing the curved teeth of an imaginary matching wheel which would mesh with the gear to be cut, effecting a generating movement between the tool and the workpiece by moving the tool in a circle which is concentric with the workpiece and rolling the circle about a circle on the workpiece while the latter is imagined to be stationary so that the cutting edges describe a cycloidal path relatively to the workpiece, rotating the workpiece around its axis to convert the cycloidal movement of the cutting edges into an arcuate movement and selecting the position and nature of the movement of the tool circle relatively to the circle on the workpiece about which it rolls so that the tool circle is the matching circle of the cutting circle and during rolling generates the same cycloid as the cutting circle.

2. A method of continuously cutting teeth in a workpiece to produce a bevel gear wheel having teeth which are arcuate in their length direction which method comprises disposing the cutting edges of a tool on a circle representing the curved teeth of an imaginary matching wheel which would mesh with the gear to be cut, effecting a generating movement between the tool and the workpiece by moving the tool in a circle which is concentric with the workpiece and rolling the circle about a circle on the workpiece while the latter is imagined to be stationary so that the cutting edges describe a cycloidal path relatively to the workpiece, rotating the workpiece around its axis to convert the cycloidal movement of the cutting edges into an arcuate movement and selecting the position and nature of the movement of the tool circle relatively to the circle on the workpiece about which it rolls so that the tool circle is the maching circle of the cutting circle and during rolling generates the same cycloid as the cutting circle.

3. A method of continuously cutting teeth in a workpiece to produce a gear wheel having teeth which are arcuate in their length direction which method comprises disposing the cutting edges of a tool on a circle representing the curved teeth of an imaginary matching face gear which would mesh with the gear to be cut, effecting a generating movement between the tool and the workpiece by moving the tool in a circle which is concentric with the workpiece and rolling the circle about a circle on the workpiece while the latter is imagined to be stationary so that the cutting edges describe a cycloidal path relatively to the workpiece, rotating the workpiece around its axis to convert the cycloidal movement of the cutting edges into an arcuate movement and selecting the position and nature of the movement of the tool circle relatively to the circle on the workpiece about which it rolls so that the tool circle is the matching circle of the cutting circle and during rolling generates the same cycloid as the cutting circle.

4. A method according to claim 3 wherein the tool functions in the plane of said face gear.

5. A method as claimed in 3 in which the tool functions as set forth in a plane other than the plane of said face gear.

6. A method according to claim 1 wherein the cutting edges are arranged to be on tool circles of different sizes to generate tooth flanks with different curvatures whereby the flanks of the wheel being produced and its matching wheel engage spherically over the tooth width.

References Cited in the file of this patent

UNITED STATES PATENTS 2,773,429     Wildhaber     Dec. 11, 1956